US010056938B2

(12) United States Patent
Six et al.

(10) Patent No.: US 10,056,938 B2
(45) Date of Patent: Aug. 21, 2018

(54) FAST RADIO FREQUENCY COMMUNICATION FOR SPORT TIMING APPLICATIONS

(71) Applicant: Mylaps B.V., Haarlen (NL)

(72) Inventors: Mark Six, Heemskerk (NL); Bas Jan Emile Van Rens, Heemstede (NL); Henk Jan Ober, Heemstede (NL); Marcel Schaap, Velsen-Zuid (NL); Adriaan Klaas Verwoerd, Hoofddorp (NL)

(73) Assignee: MAYLAPS B.V., Haarlem (NL)

( * ) Notice: Subject to any disclaimer, the term of this patent is extended or adjusted under 35 U.S.C. 154(b) by 361 days.

(21) Appl. No.: 15/074,476

(22) Filed: Mar. 18, 2016

(65) Prior Publication Data

US 2016/0308578 A1 Oct. 20, 2016

Related U.S. Application Data

(63) Continuation of application No. PCT/EP2015/073658, filed on Oct. 13, 2015.

(30) Foreign Application Priority Data

Oct. 13, 2014 (EP) .................................... 14188594

(51) Int. Cl.

| | |
|---|---|
| ***H04B 1/7156*** | (2011.01) |
| ***H04B 1/713*** | (2011.01) |
| ***H04W 72/04*** | (2009.01) |

(52) U.S. Cl.

CPC ........... *H04B 1/7156* (2013.01); *H04B 1/713* (2013.01); *H04W 72/04* (2013.01); *H04B 2001/71563* (2013.01)

(58) Field of Classification Search

CPC ...... H04B 1/713; H04B 1/7156; H04B 7/212; H04J 3/00; H04J 11/05; H04L 12/413;

(Continued)

(56) References Cited

U.S. PATENT DOCUMENTS

| | | | |
|---|---|---|---|
| 5,515,369 | A | 5/1996 | Flammer, III et al. |
| 2004/0013166 | A1 | 1/2004 | Goodings |

(Continued)

FOREIGN PATENT DOCUMENTS

| | | |
|---|---|---|
| WO | 96/00467 A1 | 1/1996 |

OTHER PUBLICATIONS

Written Opinion of the International Searching Authority for International Application No. PCT/EP2015/073658, filed Oct. 13, 2015, 8 pages.

*Primary Examiner* — Andrew Lai
*Assistant Examiner* — Leon Andrews
(74) *Attorney, Agent, or Firm* — Steven M. Koehler; Westman, Champlin & Koehler, P.A.

(57) ABSTRACT

Computer-implemented methods for managing communication between each of the plurality of wireless RF nodes and a base station using frequency hopping over M non-overlapping frequency channels in a wireless network is provided. The communication is carried out according to a time slot schedule comprising M time slot assemblies, each time slot assembly comprising at least one time slot for the base station to transmit, preferably by broadcast, data on a different channel of the M channels, and R time slots, R being an integer equal to or greater than 1, for one or more of the plurality of nodes to transmit data to the base station. The methods described herein enable a point-to-multipoint wireless communication system in an ISM frequency band that can provide a reliable RF data link even in an area that (Continued)

already comprises one or more WLAN networks that operate in the same ISM frequency band.

21 Claims, 6 Drawing Sheets

(58) Field of Classification Search
CPC ......... H04N 21/80; H04Q 7/00; H04W 72/04; H04W 72/0446; H04W 72/0453; H04W 72/1215
See application file for complete search history.

(56) References Cited

U.S. PATENT DOCUMENTS

2010/0142495 A1* 6/2010 Li ..................... H04W 72/1215 370/337
2012/0011545 A1* 1/2012 Doets ................. H04N 7/17336 725/38

* cited by examiner

FAST RADIO FREQUENCY COMMUNICATION FOR SPORT TIMING APPLICATIONS

CROSS-REFERENCE TO RELATED APPLICATIONS

The present application is a continuation and claims priority of International patent application Serial No. PCT/EP2015/073658, filed Oct. 13, 2015, the content of which is incorporated herein in its entirety.

BACKGROUND

The discussion below is merely provided for general background information and is not intended to be used as an aid in determining the scope of the claimed subject matter.

FIELD OF THE INVENTION

The invention relates to a radio frequency (RF) communications protocol, and, in particular, though not exclusively, to methods, computer programs, and devices for managing communication in a wireless network comprising an RF base station and a plurality of RF transceiver devices.

BACKGROUND OF THE INVENTION

Currently communication systems for sports applications, such as e.g. systems used at the racing tracks, employ a loop transponder system where a base station communicates via inductive loops in or along the road with the individual transponders on the sports vehicles. These loops typically have a range for data communication of approximately 2 meters. Such a short range often becomes problematic, especially when a vehicle crosses the loop at high speeds, because the short range results in a short time window (around 20-40 ms) for communication of data between the vehicle and the base station. This problem is exacerbated further by the fact that there is an increasing need to provide a high data rate communication, in particular a downlink from the vehicle to the base station, so that beside accurate timing information also e.g. sensor data of the vehicle and of the driver of the vehicle can be sent to the base station for processing.

Wireless local area network (WLAN) type communication links such as WiFi may be used to provide an RF communication area of approximately 100-200 meters around the transmitter at a 2.4 GHz industrial, scientific, and medical (ISM) frequency band that is globally available, thereby providing a much larger time window for data transmission between the vehicles and the base station. However, current WiFi protocol stacks are based on a five-layer TCP protocol and do not provide fast set-up of the RF link when the vehicle enters the communication area. The overhead in the registration, authentication, channel assignment and collision procedures of existing WiFi standards make those protocols not suitable for sports applications where timing is crucial.

A further problem regarding the use of an WLAN type communication area for race timing applications relates to the fact that the wireless communication system on a racing track should be suitable for ad-hoc (i.e. "plug-and-play") installation in a particular area, such as e.g. the finish area, wherein WiFi 2.4 GHz networks may already be in place. In such situations, the existing WiFi networks should not interfere with the data transmission between the vehicles and the base station of the race timing system.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

One objective of at least some embodiments of the invention is to reduce or eliminate at least one of the drawbacks known in the prior art. To that end, an RF communication system comprising an RF base station and a plurality of RF nodes is provided, as well as methods are specified that are to be followed by each of the RF nodes and the base station. The system and methods described herein enable a point-to-multipoint wireless communication system in an ISM frequency band that can provide a reliable RF data link even in an area that already comprises one or more WLAN networks that operate in the same ISM frequency band. The system and methods described herein are particularly suitable for and meet the requirements of timing applications on race tracks.

According to one aspect of the present invention, a computer-implemented method for an RF node of a plurality of nodes to communicate with a base station using frequency hopping, preferably using Frequency Hopping Spread Spectrum (FHSS) modulation scheme, over M non-overlapping frequency channels ($CH_1$-$CH_M$) in a wireless network is provided. Since this method is intended to be performed by an RF node, this method is referred to herein as an "RF node method". M is an integer equal to or greater than 2, which may be set as an integer that is greater than a specified minimum number of channels, e.g. the minimum number of channels prescribed by the ETSI regulations for use of the FHSS scheme. The communication is carried out according to a time slot schedule comprising M time slot assemblies ($A_1$-$A_M$), each time slot assembly ($A_i$) of the M time slot assemblies ($A_1$-$A_M$) comprising at least one time slot (TX-$bs_i$) for the base station to transmit, preferably by broadcast, data on a different channel of the M channels, and R time slots ($TXrn_{1,i}$-$TXrn_{R,i}$), R being an integer equal to or greater than 1, for one or more of the plurality of nodes to transmit data to the base station. The method includes the steps of monitoring, i.e. the node being configured for receiving data on, one of the M channels to receive a first communication packet from the base station, transmitted over the monitored channel, and, based on data contained within the first communication packet received from the base station, determining a sequence of channels of at least some of the M channels that the base station will follow to transmit one or more subsequent communication packets and the times at which the base station will transmit the packets on each channel of the determined sequence of channels. The method further includes the step of determining assignment information for the node from at least one of: the first communication packet and the one or more of subsequent communication packets. The assignment information indicates for at least one time slot assembly of the M time slot assemblies ($A_1$-$A_M$), but preferably for each time slot assembly of the M time slot assemblies, a channel of the M channels for transmission of data from the node to the base station and which one or more of the R time slots is to be used for the transmission of data from the node to the base station. The channels assigned to the node for transmission of data in different ones of the M time slot assemblies are different channels of the M channels. The channels are assigned to the node for transmission of data so that if a channel is also assigned to another node of the plurality of nodes for transmission of data in the same time slot of the R time slots, then the channel assigned to the other node and the channel assigned to the first node for transmission of data in the same time slot are different channels of the M channels. At least two of the plurality of nodes are assigned (different) channels for transmission of data in the same time slot for at least one of the R time slots. The method further includes the step of transmitting data, or at least providing an instruction to do so, from the node to the base station in accordance with the determined assignment information.

According to another aspect of the present invention, a computer-implemented method for a time scheduler of an RF communication system to manage RF communication between the base station and the plurality of nodes as described above is provided. Since this method is intended to be performed by a time slot scheduler which could be included anywhere in the RF communication system described herein but is preferably included within the base station, this method is referred to herein as an "RF base station method". The method includes steps of providing a time slot schedule comprising M time slot assemblies ($A_1$-$A_M$), each time slot assembly ($A_i$) of the M time slot assemblies ($A_1$-$A_M$) comprising at least one time slot ($TXbs_i$) for the base station to transmit, preferably by broadcast, data on a different channel of the M channels, and R time slots ($TXrn_{1,i}$-$TXrn_{R,i}$), R being an integer equal to or greater than 1, for a plurality of registered nodes to transmit data to the base station. The method further includes assigning to each registered node a channel of the M channels for transmission of data from each registered node to the base station over the duration of at least one of the R time slots. For each registered node, the channels assigned to the node for transmission of data in different time slot assemblies are different channels of the M channels. The plurality of registered nodes is assigned so that two or more registered nodes assigned to transmit data to the base station in the same time slot of the R time slots are assigned to transmit data on a respective different channel of the M channels. At least two of the registered nodes are assigned (different) channels for transmission of data in the same time slot for at least one of the R time slots.

In the context of the at least one time slot of each time slot assembly being designated for the base station to transmit data on a different channel of the M channels, the term "different" in the expression "different channel" is used to indicate that the channels on which the base station is configured to transmit data in this designated time slot are different between the different ones of the M time slot assemblies. In other words, the channels assigned to the base station for transmission of data in different time slot assemblies are different channels of the M channels.

The M channels are preferably non-overlapping channels, where, as used herein, the term "non-overlapping" is used to describe that the frequency and bandwidth used for one channel does not have substantial overlap with the frequency and bandwidth of another channel. For example a channel with a center frequency 2401 Mhz and bandwidth of 2 Mhz has a 1 Mhz overlap with a channel with center frequency 2402 Mhz and bandwidth of 2 Mhz. In other words, the term "non-overlapping channels" means that the center frequency and bandwidth of one channel does not fall into the center frequency and bandwidth of another channel.

Embodiments of the present invention are based on the recognition that using a time slot schedule that controls assignment of the times and the channels for transmitting of data by each entity involved (i.e., the base station and the plurality of the nodes) optimizes data communication. By designating its own, separate, time slots for data transmission by the base station and data transmission by the nodes ensures that collisions and interferences between transmission of data by the base station and that by the nodes is minimized or even eliminated. In addition, it allows using a single receiver/transmitter in each of the nodes, operating in half-duplex mode. Each node can then be configured to listen to (i.e., receive) the data transmission of the base station at least over a part of (but preferably the entire) duration of the time slot(s) within each time slot assembly assigned for the data transmission by the base station and then re-configure itself to transmit data to the base station at least over a part of (but preferably the entire) duration of the R time slot(s) within each time slot assembly assigned for the data transmission by the node.

Furthermore, such a time slot schedule allows implementation of the FHSS modulation scheme for the communications by each of the transmitting entities involved (i.e., the RF base station and each of the RF nodes), which allows transmitting data at higher power as compared with other forms of data communication, such as e.g. Direct Sequence Spread Spectrum (DSSS) employed in WiFi. For example, according to the current regulations in Europe, put forward in the ETSI standard, using FHSS allows transmitting data with 100 mWatt, while WiFi is only allowed transmission with 10 mWatt (current regulations in the US allow transmitting FHSS data even with as much as 1 Watt power). Data transmission with higher power is particularly beneficial for sports, especially for racing applications where vehicles pass the base station at very high speeds, because increased transmission power increases the distance over which communication between the vehicle and the base station is possible, thereby allowing more time for the communication.

In addition, being able to transmit data with several times more power than WiFi ensures that the data transmitted can be received even when there are WiFi signals present at a particular location where the methods and systems of the present invention are deployed. Further minimization of possible interference with the WiFi networks may be achieved by selecting frequency channels $CH_1$-$CH_M$ such that the selected channels are as far from the center frequencies of the WiFi channels as possible.

Still further, using different modulation than is used in WiFi (i.e., FHSS vs DSSS) allows for data recovery on WiFi when a small part of the signal may become corrupted. Thus, the RF communication according to the methods described herein allows ad-hoc plug and play implementations using the publicly available 2.4 GHz ISM band even in the locations where there is an existing WiFi system, without requiring any user configuration.

While FHSS provides many advantages, as any other standardized technique, it also poses certain requirements with respect to data communication that need to be complied with.

One of the requirements for using FHSS in the 2.4 GHz band is that, as is clear from the name of this modulation technique, data transmission has to take place by hopping (i.e. switching) between a minimum number of well-defined, substantially non-overlapping channels. Currently, the ETSI regulations prescribe the use of at least 15 such channels. This requirement is satisfied with the above-described time slot schedule because the schedule ensures that each entity transmits data by hopping over a respective sequence of M channels (thus, according to the current ETSI regulations, M must be equal to or greater than 15). For example, providing at least one time slot for the base station to transmit data on a different channel of the M channels for each time slot assembly ($A_i$) ensures that, over the M time slot assemblies ($A_1$-$A_M$), the base station follows a sequence of M different channels for transmission of data. Similarly, registering two or more of the plurality of nodes to form the plurality of registered nodes by assigning, for each registered node within at least some of, but preferably each of the time slot assemblies (Ai), a different channel of the M channels for transmission of data from the node to the base station over the duration of at least one of the R time slots of the each time slot assembly (Ai) ensures that each registered node also follows a respective sequence of M different channels for transmission of data over the M time slot assemblies ($A_1$-$A_M$).

Another requirement of using FHSS relates to not transmitting on the same channel for longer than the maximum allowed time, referred to as a "dwell time." Currently, the ETSI regulations prescribe the maximum dwell time to be 0.4 seconds. This requirement can be satisfied with the above-described time slot schedule by selecting the time slots of such duration that no entity transmits on a single channel longer than the maximum dwell time allowed.

While there is a limitation in the ETSI regulations on the duration of the transmission, there are no limitations on the duration of the receipt of data. Therefore, the above-described methods may be implemented using a base station with a single transmitter able to transmit sequentially at different frequencies and multiple (namely, M) receivers, each receiver tuned to a different frequency channel. Such a base station would be capable of receiving data even when two or more registered nodes are assigned to transmit their respective data to the base station in the same time slot, since each node is transmitting on its own respective channel of the M channels.

In one embodiment of the RF node method, each time slot assembly ($A_i$) of the M time slot assemblies ($A_1$-$A_M$) further may comprise U time slots ($TXun_{1,i}$-$TXun_{U,i}$), U being an integer equal to or greater than 1, for one or more of unregistered nodes to transmit data to the base station. The one or more unregistered nodes comprise those nodes of the plurality of nodes which do not have the assignment information (i.e., nodes which are not registered nodes). In such an embodiment, the RF node method may further comprise the steps of determining, from at least one of the first communication packet and the one or more of subsequent communication packets, when at least one of the U time slots of the M time slot assemblies takes place, and transmitting a registration message to the base station within one time slot of the determined at least one of the U time slots, the registration message requesting the assignment information for the node. In one further embodiment, such a registration message may comprise a data packet comprising an identification of the node, e.g. a unique serial number of the node. In another further embodiment, the one time slot for transmitting the registration message may be selected from the determined one or more of the U time slots using a pseudorandom number generator, possibly using an identification of the node as a seed.

In one embodiment of the RF node method, the node may be configured to determine the sequence of channels of at least some of the M channels that the base station will follow based on an indication of a current sequence of channels followed by the base station. The length of the sequence determined by the node is such that it allows the node to follow the base station in frequency (i.e., channel) and time long enough to receive the relevant assignment information (i.e., the assignment information for the node).

In one further embodiment, the indication of the current sequence of channels followed by the base station may comprise a seed used by a pseudorandom sequence generator to generate the current sequence of channels followed by the base station. Such an embodiment allows the node to re-create the sequence of channels followed by the base station by using the seed value and the same pseudorandom algorithm used by the base station to generate the sequence.

In one embodiment of the RF node method, the method may further comprise obtaining from at least one of the first communication packet and the one or more of subsequent communication packets one or more packets of data destined for the node. In this manner, the node may receive data from the base station. Preferably, the method further comprises obtaining packet sequence identification for the one or more packets of data destined for the node. In this manner, if the base station transmits multiple packets of data to the node, the node can put the received packets in the correct order. In an embodiment, the data in the one or more packets may comprise CAN packet data. This embodiment provides the advantage of e.g. being able to directly broadcast the packets on the CAN bus commonly used in vehicles without the overhead of protocol conversion.

In one embodiment of the RF node method, the method may further comprise obtaining, from at least one of the first communication packet and the one or more of subsequent communication packets, one or more acknowledgements of the base station having received data previously transmitted by the node to the base station. This embodiment provides the advantage of knowing whether the packet has been received or whether it needs to be resend to the base station.

In one embodiment of the RF base station method, assignment information for at least some of the plurality of registered nodes may be transmitted as a part of the data transmitted by the base station during the at least one time slot, where assignment information comprises information indicative of the at least one of the R time slots and the channel assigned to the registered node for the transmission of data from the node to the base station over the duration of the at least one of the R time slots. In one further embodiment, transmission of the assignment information for at least some of the plurality of registered nodes is divided substantially evenly among the M time slot assemblies ($A_1$-$A_M$).

In one embodiment of the RF base station method, the data transmitted by the base station during at least some of the time slot assemblies (A1-AM), preferably in the each time slot assembly, may comprise one or more of an identification of a current sequence of channels followed by the base station, where the current sequence followed by the base station sequence is a sequence of the different channels of the M channels for the base station to transmit data in the M time slot assemblies (A1-AM), where preferably the identification of the current sequence comprises a seed used by a pseudorandom sequence generator to generate the current sequence, a channel sequence index identifying the current time slot assembly of the plurality of the time slot assemblies, one or more identifications of nodes of the plurality of nodes that have been denied registration, one or more packets of data destined for one or more of the plurality of registered nodes, where preferably the data in the one or more packets comprises CAN packet data and/or preferably the data transmitted by the base station comprises packet sequence identification for the one or more packets of data destined for the one or more of the plurality of registered nodes, and one or more acknowledgements of the base station having received data transmitted by one or more of the plurality of registered nodes.

In one embodiment of the RF base station method, each time slot assembly ($A_i$) of the time slot assemblies ($A_1$-$A_M$) may further comprise U time slots ($TXun_{1,i}$-$TXun_{U,i}$), U being an integer equal to or greater than 1, for one or more of unregistered nodes to transmit data to the base station, where the one or more unregistered nodes comprise those nodes of the plurality of nodes which are not one of the plurality of registered nodes. In one further embodiment, the method may further comprise receiving a registration message from an unregistered node of the one or more unregistered nodes indicating that the unregistered node is to become registered.

According to another aspect of the invention, a wireless node is provided. The node comprises a microcontroller configured for executing or enabling the execution of (by e.g. providing an appropriate instruction to a piece of hardware within the node) any of the method steps described herein as performed by the node. The wireless node preferably further comprises an RF receiver and transmitter module configured to operate in half-duplex mode. The RF receiver is configured for receiving the first communication packet and the subsequent communication packets from the base station. The RF transmitter is configured for transmitting the data from the node to the base station by switching over the M channels according to the FHSS scheme.

According to another aspect of the present invention, a time slot scheduler is provided. The time slot scheduler comprises a microcontroller configured for executing any of the method steps described herein as performed by the RF base station.

According to another aspect of the present invention, a base station is provided. Such a base station comprises the time slot scheduler as described herein as well as a transmitter configured for transmitting, preferably by broadcast, data during the at least one time slot for the base station to transmit data, the transmitter configured to transmit the data by sequentially transmitting on a different one of the M channels, and M receivers configured for receiving data from the plurality of nodes during at least the R time slots for the plurality of registered nodes to transmit data, each of the M receivers configured to receive data on a different one of the M channels.

Using multiple receivers and a single transmitter in the RF base station while using a single receiver/transmitter in the plurality of nodes allows providing a greater amount of bandwidth for the communications from the nodes to the base station. This is particularly advantageous for applications where there is (significantly) more data to send from the nodes to the base station than the other way around, such as e.g. vehicle racing applications.

According to other aspects of the present invention, computer program comprising software code portions and computer-readable storage medium storing software code portions are disclosed. Preferably, the computer-readable storage medium is non-transitory. The software code portions are configured for, when run on a computer (i.e., when executed on a processor of a computer), executing the method steps described herein as performed by the node, the time slot scheduler, and/or the base station.

According to other aspects of the present invention, a computer-implemented data structure, e.g. stored on a non-transitory computer-readable storage medium, is disclosed. The data structure is configured for a base station to transmit data during one time slot assembly of M time slot assemblies on a different frequency channel of a sequence of channels followed by the base station, the sequence of channels comprising M different frequency channels in a wireless network, M being an integer equal to or greater than 2, each time slot assembly of the M time slot assemblies comprising at least one time slot for the base station to transmit, preferably by broadcast, data on a different channel of the M channels, and R time slots, R being an integer equal to or greater than 1, for one or more of a plurality of nodes to transmit data to the base station, the data structure comprising: assignment information for at least some of a plurality of registered nodes, wherein the assignment information indicates for at least one time slot assembly of the M time slot assemblies, preferably for the each time slot assembly of the time slot assemblies, a channel of the M channels for transmission of data from the node to the base station, and for each of the at least some of the plurality of registered nodes which one or more of the R time slots is to be used for the transmission of data from the node to the base station, wherein the channels assigned to the node for transmission of data in different ones of the time slot assemblies are different channels of the M channels, wherein the channels are assigned to the node for transmission of data so that if a channel is also assigned to another node of the plurality of nodes for transmission of data in the same time slot of the R time slots, then the channel assigned to the other node and the channel assigned to the node for transmission of data in the same time slot are different channels of the M channels, and wherein at least two of the plurality of nodes are assigned channels for transmission of data in the same time slot for at least one of the R time slots.

In an embodiment, the data structure is configured for a base station to transmit data during one time slot assembly of M time slot assemblies on a different frequency channel of a sequence of channels followed by the base station, the sequence of channels comprising M different frequency channels in a wireless network, M being an integer equal to or greater than 2, the data structure comprising: an identification of the sequence of channels followed by the base station, wherein preferably the identification of the sequence comprises a seed used by a pseudorandom sequence generator to generate the sequence, a channel sequence index identifying the one time slot assembly of the plurality of the time slot assemblies, one or more identifications of nodes of a plurality of nodes that have been denied registration, one or more packets of data destined for one or more of a plurality of registered nodes, wherein preferably the data in the one or more packets comprises CAN packet data and/or preferably the data structure further comprises a packet sequence identification for the one or more packets of data destined for the one or more of the plurality of registered nodes, and one or more acknowledgements of the base station having received data transmitted by one or more of the plurality of registered nodes.

The invention will be further illustrated with reference to the attached drawings, which schematically will show embodiments according to the invention. It will be understood that the invention is not in any way restricted to these specific embodiments.

DETAILED DESCRIPTION OF THE ILLUSTRATIVE EMBODIMENTS

Figure 1:
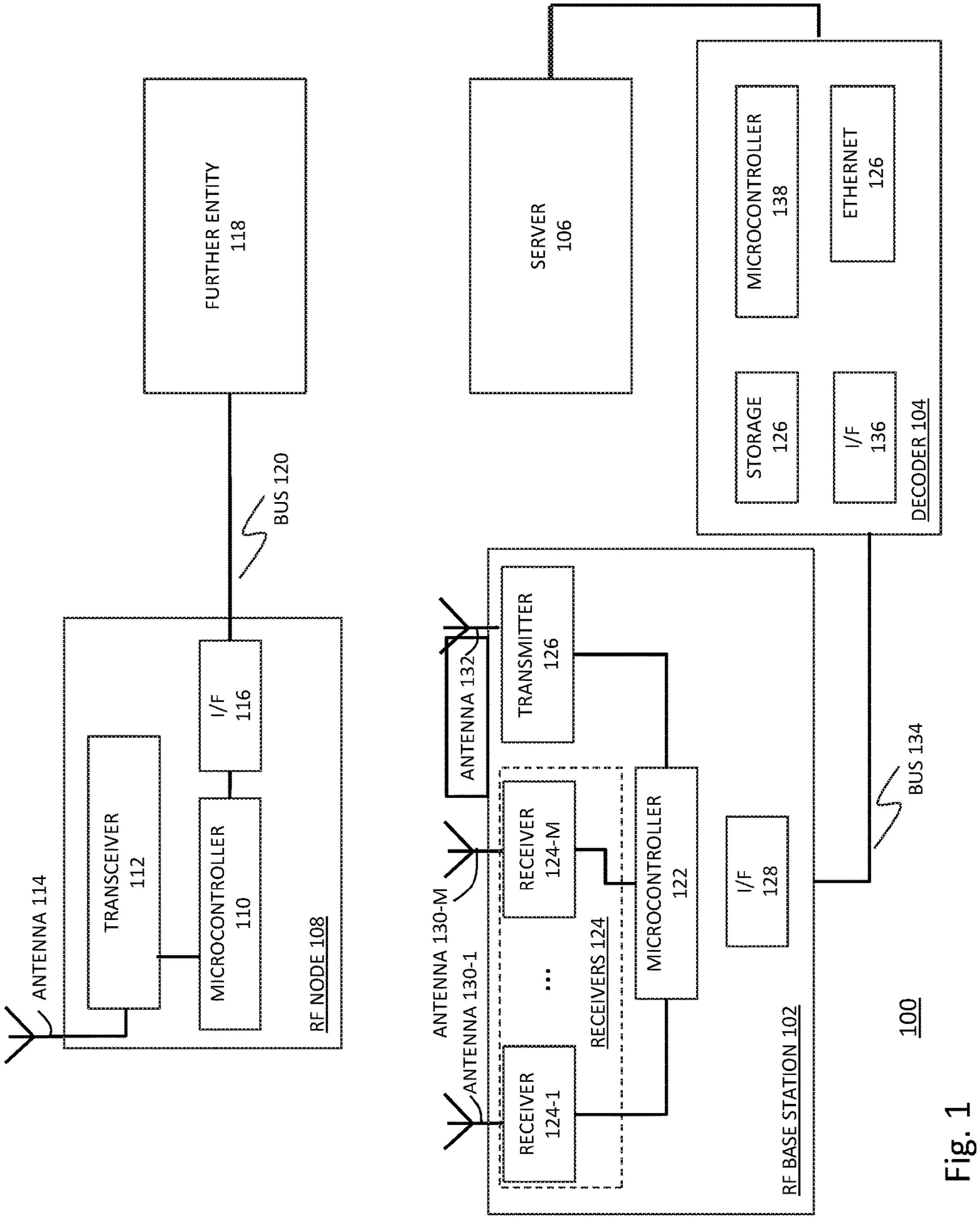
FIG. 1 provides a schematic illustration of an RF communication system according to one embodiment of the present invention.

FIG. 1 provides a schematic illustration of an RF communication system 100 according to one embodiment of the present invention. The system 100 comprises an RF base station 102 connected to a decoder 104 and a server 106, and at least one, but typically a plurality, of RF nodes 108 (in order to not obscure the drawing, only one RF node 108 is illustrated in FIG. 1). As described herein, the system 100 is capable of managing RF communication between the base station 102 and the plurality of nodes 108 implementing frequency hopping, using e.g. FHSS scheme, over M substantially non-overlapping frequency channels, the channels e.g. being within the publicly available 2.4 GHz ISM band.

Each one of the nodes 108 in the system 100 may be identified by a unique node identifier. Each one of the nodes 108 could comprise or be included within e.g. a transponder used on racing vehicles.

Each one of the nodes 108 comprises a microcontroller 110. The microcontroller 110 is a data processing system configured for implementing steps of the methods described herein as performed by the node 108. An example of such a data processing system is illustrated in and described with reference to FIG. 2.

The microcontroller 110 of the node 108 is connected to or contains a communications module shown in FIG. 1 as an RF transceiver 112. In a preferred embodiment, the transceiver 112 is a single RF receiver/transmitter operating in half duplex mode. While the following description will be provided for this preferred embodiment, of course the teachings provided herein are also applicable to other embodiments, e.g. an embodiment where the transceiver 112 could comprise a receiver and a transmitter separate from one another.

The transceiver 112 is configured to receive and transmit data on each of the M substantially non-overlapping frequency channels $CH_1$-$CH_M$ (CH="Channel") using FHSS, where M is an integer equal to or greater than 2. For example, according to the ETSI regulations in Europe for 2.4 GHz band, at least 15 well defined non-overlapping channels must be used for transmitting data using FHSS, with the time for data transmission on each channel not exceeding 0.4 seconds (so-called "dwell time"). Thus, according to these regulations, M must be equal to or greater than 15. Currently, FHSS regulations do not pose any limit on the amount of time data is received on a single channel. The microcontroller 110 is configured to control the transceiver 112 by tuning the transceiver 112 to receive and/or transmit data on specified channels for specified periods of time, as necessary to implement embodiments of the present invention. The microcontroller 110 is also configured to control the power with which the transceiver 112 transmits data. For example, according to the ETSI regulations in Europe for 2.4 GHz band, the transceiver 112 can send data with 100 mill watt (mWatt) power.

In a preferred embodiment, M is equal to 16. Such an embodiment is preferred because ETSI requires a minimum of 15 channels for FHSS and 16 is the closest power of two allowing a hardware implementation of two banks of 8 receivers each using antenna combiners and amplifiers to use a single antenna per bank.

In a preferred embodiment, the M channels are the channels within the publicly available 2.4 GHz ISM band.

In a preferred embodiment, the M channels are selected so that the overlap with frequency channels which may already be deployed in a particular location is minimized. Such selection of channels allows minimizing interference that other RF systems already deployed in the location may receive as a result of the deployment of the system 100 and vice versa. For example, for operation in the 2.4 GHz frequency band, the M channels could be selected as to minimize interference between the data communication on the M channels of the system 100 and the WiFi channels of a WiFi system which may be already deployed in a particular location. For example, if a WiFi system uses 13 channels of 22 MHz of the available 85 MHz in the 2.4 GHz ISM band, the 13 WiFi channels having center frequencies at 2412 MHz, 2417 MHz, 2422 MHz, 2427 MHz, 2432 MHz, 2437 MHz, 2442 MHz, 2447 MHz, 2452 MHz, 2457 MHz, 2462 MHz, 2467 MHz, 2472 MHz, and 2484 MHz, then sixteen channels (i.e. for the preferred embodiment of M=16) according to one embodiment of the present invention could be selected as channels with center frequencies at e.g. 2405 Mhz, 2410 Mhz, 2415 Mhz, 2420 Mhz, 2425 Mhz, 2430 Mhz, 2435 Mhz, 2440 Mhz, 2445 Mhz, 2450 Mhz, 2455 Mhz, 2460 Mhz, 2465 Mhz, 2470 Mhz, 2475 Mhz and 2480 Mhz all using 1 Mhz channel bandwidth When deployed in a particular setting, the node 108 should be placed so that the antenna 114 of the transceiver 112 would have an adequate line of sight connection to the antennas of the RF base station 102. For example, in vehicle racing applications, the node 108 would be placed somewhere on the vehicle so that there is a good line of sight connection between the antenna 114 of the node 108 and the antennas of the RF base station 102.

Each one of the nodes 108 further comprises an interface 116 for communicating data between the node 108 and a further entity 118, e.g. via a bus 120. The further entity 118 is the entity that provides data to the node 108 that is to be transmitted to the base station 102 and the entity that receives data from the base station 102 via the node 108. For example, in vehicle racing applications the further entity 118 could comprise one or more of a global positioning system (GPS), inertial measurement units, oil pressure monitors, an onboard display displaying e.g. lap times for the driver of a vehicle, sensors measuring heart beat and other vital characteristics of the driver, etc. Optionally, the further entity 118 could be a part of the node 108.

In one embodiment, the interface 116 could comprise a controller area network (CAN) interface and the bus 120 could, therefore, comprise a CAN bus. The CAN standard ISO-11898: 2003 defines a wired communication network (a CAN network) that links devices that are connected via a CAN interface to the CAN bus to each other and enables the devices to talk and/or exchange data with one another on the basis of CAN messages or CAN packets. The CAN network may comprise a central CAN controller and devices may be added to the network at any time, even while the network is operating (such operation is sometimes referred to as "hot-plugging"). The CAN bus may be configured as a differential data bus so that it is robust against noise and harsh environments and allows high signaling rates. This is particular advantageous in automotive environments.

Hence, in such an embodiment, the CAN interface 116 would be connected to the CAN bus 120 of e.g. the race vehicle so that the node becomes part of the CAN network of the vehicle and so that the CAN interface 116 can send and receive CAN packets e.g. to/from CAN-enabled devices in the vehicle, including: sensors on the vehicle such as GPS, inertial measurement units, or (oil) pressure monitors, an onboard display for displaying timing information such as lap times and a data logging system.

The node 108 may further comprise other components not shown in FIG. 1, such as e.g. memory or a power unit. The power unit could comprising a power source, e.g. one or more batteries, and a power controller. In an embodiment, the power unit may further comprise one or more alternative power sources, e.g. a solar cell or the like. The power controller may control the power mode of the different components in the node. For example, if the processor/microcontroller requires the node to be in sleep state it may turn the components off or set these components in a low-power mode. Similarly, the memory of the node and/or of the microprocessor within the node may be active during a data write cycle.

The RF base station 102 comprises a microcontroller 122 connected to multiple RF receivers 124, a single radio transmitter 126, and an interface 128 for data communication.

In an embodiment, the receivers 124 could be implemented in a Field Programmable Gate Array (FPGA) or Digital Signal Processor (DSP).

In an embodiment, it is also possible that the receivers 124 share one antenna. The signal could first be amplified and then divided multiple times. Each division could result in e.g. a 3 dB signal loss. Therefore, for 8 receivers to share one antenna, an amplifier of 9 dB would be needed to have the same received signal strength at the receiver.

The microcontroller 122 is a data processing system configured for implementing steps of the methods described herein as performed by the base station 104. An example of such a data processing system is illustrated in and described with reference to FIG. 2.

While the RF base station 102 only needs to include a single RF transmitter 126, the number of RF receivers 124 is at least M, corresponding to the M channels described above. Therefore, the receivers 124 of the base station 102 are shown in FIG. 1 as receivers 124-1 through 124-M. Each of the RF receivers 124 is configured to receive data at a different one of the M channels that the node 108 is configured to use to transmit data. Thus, each one of the RF receivers 124 receives data only on a single frequency channel. As will be described in greater detail below, the configuration of the base station 102 where there is only a single transmitter but M receivers allows scheduling data reception/transmission by the base station 102 from/to plurality of nodes 108 in a manner that avoids data collision and interference. The base station 102 having M designated receivers each tuned to a different frequency channel allows the base station 102 to receive data from different nodes 108 at the same time, as long as the different nodes 108 transmitting data to the base station at the same time transmit data on the different one of the M channels. The base station 102 having only a single transmitter ensures that a time slot schedule can be created that allows the nodes 108 to determine when the base station 102 will be transmitting data and make sure that, at that time, transceivers 112 of the nodes 108 are configured to receive data (and to not send data).

When deployed in a particular setting, the base station 102 is preferably placed so that the M antennas 130-1 through 130-M of the RF receivers 124 as well as the antenna 132 of the transmitter 126 is in line of sight connection to the antennas of the RF nodes 108 at least at the times when the RF nodes 108 are in the range of the RF communication with the RF base station 102.

The interface 128 is for communicating data between the RF base station 102 and the decoder 104, e.g. via a bus 134, the decoder 104 comprising a corresponding interface 136. In an embodiment, the interfaces 128 and 136 are CAN interfaces for communicating CAN packets, and the bus 134 is a CAN bus. Connecting the CAN interface 128 of the RF base station 102 to the CAN interface 136 of the decoder 104 forms a point to point CAN bus connection between the RF base station 102 and the decoder 104.

In addition to the interface 136, the decoder 104 also includes a microcontroller 138 for controlling the functionality of the decoder 104. The microcontroller 138 is a data processing system such as e.g. illustrated in and described with reference to FIG. 2. The microcontroller 138 is connected to an interface 140 for connecting the decoder 104 to the server 106. In an embodiment, the interface 140 comprises an Ethernet interface.

In an embodiment, the decoder 104 may be included within the RF base station 102. In such an embodiment, the functionality of the microcontroller 138 is added to the functionality of the microcontroller 122, the microcontroller 122 configured for implementing method steps described herein as performed by the RF base station 102.

Figure 2:
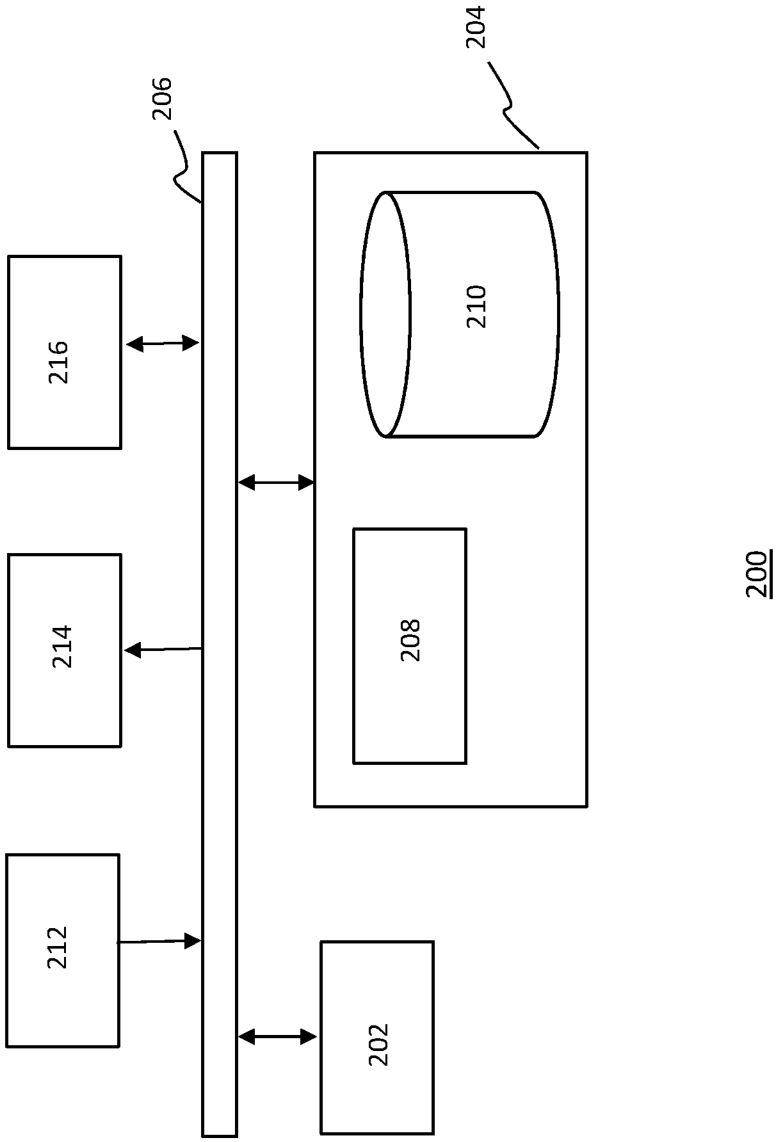
FIG. 2 depicts an exemplary data processing system according to one embodiment of the present invention.

The server 106, preferably connected to the decoder 104 via an Ethernet interface, is a data processing system such as the one illustrated in FIG. 2, configured to run one or more applications that make use of the RF communication system 100 to send/receive data to/from nodes 108, such as e.g. vehicles on the race track. Such applications could include e.g. an application that sends lap times to the vehicle or an application that receives the current GPS location of the vehicles on the race track (as long as they are in range of the RF base station 102).

In an embodiment, the functionality of the server 106 may be included within the RF base station 102 or within the decoder 104.

FIG. 2 depicts an exemplary data processing system 200 according to one embodiment of the present invention. Such a data processing system may be used in the RF communication system 100 as each one of the microcontroller 110, the microcontroller 122, the microcontroller 138, and/or the server 106 described with reference to FIG. 1.

The data processing system 200 may include at least one processor 202 coupled to memory elements 204 through a system bus 206. As such, the data processing system may store program code within the memory elements 204. Further, the processor 202 may execute the program code accessed from the memory elements 204 via the system bus 206. In one aspect, the data processing system 200 may be implemented as a computer that is suitable for storing and/or executing program code. It should be appreciated, however, that system 200 may be implemented in the form of any system including a processor and memory that is capable of performing the functions described within this specification.

The memory elements 204 may include one or more physical memory devices such as, for example, a local memory 208 and one or more bulk storage devices 210. Local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

Input/output (I/O) devices depicted as input device 212 and output device 214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers (not shown in FIG. 2). A network adapter 216 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 200.

The memory elements 204 may store an application. The stored application, being implemented in the form of executable program code, can be executed by the data processing system 200, e.g., by the processor 202. Responsive to executing the application, the data processing system may be configured to perform one or more operations described herein. It should be appreciated that data processing system 200 may further execute an operating system (not shown) that can facilitate execution of the application.

In one aspect, for example, the data processing system 200 may represent a client data processing system. In that case, the stored application may represent a client application that, when executed, configures the data processing system 200 to perform the various functions described herein with reference to a "client". Examples of a client can include, but are not limited to, a personal computer, a portable computer, a mobile phone, or the like.

In another aspect, the data processing system 200 may represent a server. For example, the data processing system 200 may represent an HTTP server in which case the application stored in the memory elements 204, when executed, may configure the data processing system 200 to perform HTTP server operations. In another aspect, the data processing system 200 may represent a secure server, a software provisioning server or a key generating server.

The RF communications within the RF system 100 may be managed by a time slot scheduler creating and maintaining a time slot schedule that specifies times when each of the transmitting entities involved (i.e., the base station 102 and the plurality of nodes 108) can transmit data to any of the other entities within the system 100. The time slot scheduler is also responsible for registering one or more nodes of the plurality of nodes 108 for communication within the system 100. A registration of a node implies assignment to the node of channels of the M channels for transmission of data from the node to the base station at specified points in time in such a manner that the regulations with regard to the use of the FHSS modulation scheme for RF transmission of data within the system 100 are complied with and that data collision and interference due to the different transmitting entities within the system 100 transmitting at the same time on the same channel is eliminated or at least minimized. The information regarding the time periods during which a particular node of the plurality of nodes 108 can transmit data to the base station and the frequency channels that the node 108 is to use for transmission in each of these periods is referred to herein as an "assignment information" for the node. Having a single entity within the system 100, the time slot scheduler, specify assignment information for each of the registered nodes, as well as prescribe actions which are allowed to be taken for the unregistered nodes (i.e., nodes of the plurality of nodes 108 which are not yet registered by being assigned transmission times/channels) allows coordinating transmission of data among the different nodes 108 and the base station 102.

In one embodiment, such a time slot scheduler could be included within the base station 102, in particular within the microcontroller 122 of the base station 102, implemented in software, hardware, or combination of both. However, in other embodiments, such a time slot scheduler could be implemented in an entity separate from the base station 102, as long as such an entity would be communicatively connected to the base station 102 in order to allow the base station to manage the communications within the system 100 according to the time slot schedule provided from the time slot scheduler. For example, such a separate entity implementing the functionality of the time slot scheduler could be the processing system of an operator (not shown in FIG. 1) who can e.g. decide whether to allow registration of the different nodes and how the time slot schedule should be set up (e.g. set the durations and the nature of the time slots within the time slot assemblies, etc.). In this case, the processing system of the operator implementing the time slot scheduler functionality could be implemented as the data processing system 200.

A slotted communication protocol such as a time-division multiple access (TDMA) protocol may be used for efficient transfer of messages between the base station 102 and the nodes 108. To that end, the time slot scheduler may be executed by the processor (e.g. the processor 202 within the microcontroller 122) wherein the scheduler is configured to generate or receive a predetermined time slot schedule. In an embodiment, time slots may be organized in (TDMA) time frames and are processed by the scheduler in synchronization with the nodes 108 in the network. Time slots may have a predetermined certain duration, e.g. FIG. 3 described below illustrates time slots of 1 millisecond (ms) duration. The scheduler may assign time slots to the node in order to configure the node to be in a predetermined state including: a transmit (send) state, a reception state (listen) and a sleep state (idle). Assignment of the time slots to the nodes is described in greater detail below.

Hence, when the time slot schedule, possibly together with the assignment information for the node, prescribes that a particular node of the plurality of nodes 108 is to be in the transmission state, the processor of the node (e.g. the processor 202 of the microcontroller 110) may instruct the communication module (i.e., the transceiver 112) of the node to activate the radio transmitter of the node and configure the radio transmitter to transmit at a specific transmission frequency channel so that the node can transmit messages at that channel, e.g. containing sensor data and/or status information. Similarly, when the time slot schedule prescribes that the node is to be in a data reception state, the processor of the node may instruct the communication module to activate the radio receiver of the node and configure the radio receiver to receive at a specific frequency channel in order for the node to receive messages at that frequency channel. Transmitted and received messages may be stored on a message queue in the memory of the node, e.g. within the memory elements 204 of the microcontroller 110.

In an embodiment, the communication module of the node may be configured to operate on one or more distinct frequency bands. In that case, the protocol may also support different frequency-distributed multiple access (FDMA), in which the frequencies assigned to the nodes for the communications are specified by the assignment information for the nodes. For instance, a single large network may be split into one or more smaller sub-networks, wherein the nodes in the one or more sub-networks may use different frequency bands for the communication. In this manner, the nodes assigned to different sub-networks can transmit and receive without interfering with the operation of other sub networks.

Figure 3:
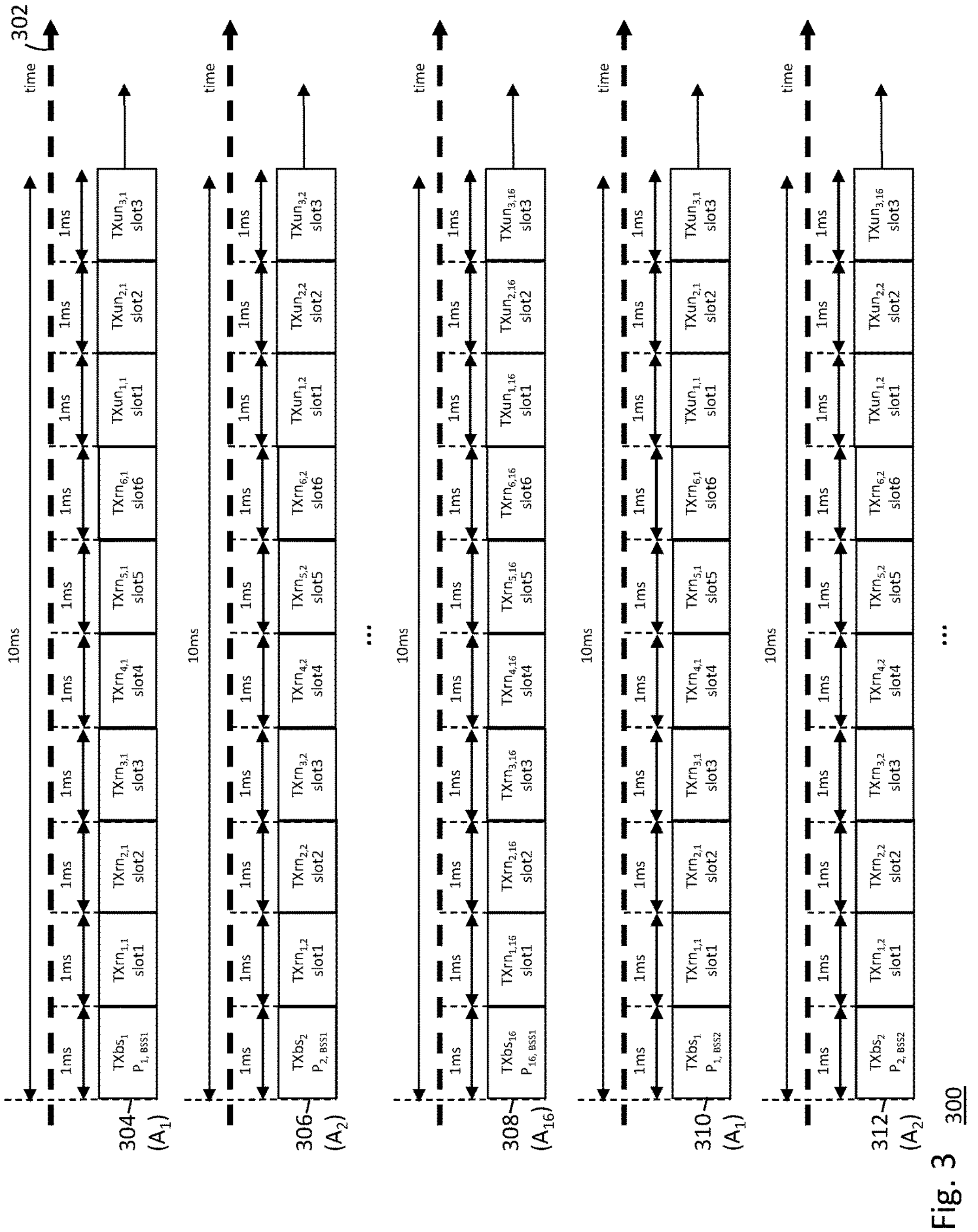
FIG. 3 provides a schematic illustration of a time slot schedule, according to one embodiment of the present invention.

FIG. 3 provides a schematic illustration of a time slot schedule 300, according to one embodiment of the present invention. The time slot schedule 300 is an example of a schedule that can be created and regulated by the time slot scheduler for coordinating transmission of data by the base station 102 and the nodes 108.

The horizontal dashed line 302 in FIG. 3 indicates the time. The time line 302 continues from one horizontal dashed line row to the next, shown as consecutive rows 304, 306, 308, 310, and 312. Transmission may continue, and preferably does continue, past the time shown in the row 312 (as is indicated in FIG. 3 with the three dots after the row 312), however is not shown in FIG. 3 in order to not clutter the drawing. Each row in FIG. 3 illustrates one time slot assembly.

The time slot scheduler provides a time slot schedule comprising at least one set of M time slot assemblies, $A_1$-$A_M$ (A="Assembly"), where M is the number of channels which are to be used by the nodes 108 and the base station 102 to transmit data using FHSS. The number M here is specified in the same manner as described above. The M time slot assemblies are shown in FIG. 3 in the rows 304-308 for the particular case of M=16, where the row 304 illustrates the first time slot assembly, $A_1$, the row 306 illustrates the second time slot assembly, $A_2$, and the row 308 illustrates the Mth time slot assembly, $A_M$. The rows 310 and 312 illustrates the first and second time slot assemblies, $A_1$ and $A_2$, respectively, of the next set of M time slot assemblies.

Each time slot assembly $A_i$, where the index "i" refers to the sequential number of the time slot assembly within the M time slot assemblies, comprises at least one time slot for the base station 102 to transmit data, $TXbs_i$ (TXbs="Transmission (TX) by base station"), shown in FIG. 3 as a time slot $TXbs_1$ for the time slot assembly $A_1$, a time slot $TXbs_2$ for the time slot assembly $A_2$, and a time slot $TXbs_{16}$ for the time slot assembly $A_{16}$, and R time slots for the registered nodes to transmit data, $TXrn_{k,i}$ (TXrn="Transmission (TX) by registered node"). The index "k" refers to the sequential number of the time slot within the R time slots, where R is an integer equal to or greater than 1. Such use of indices "i" and "k" is consistent throughout the present description, i.e. it applies also to other variables.

The example of FIG. 3 illustrates each time slot assembly as having 6 time slots for the registered nodes to transmit data (i.e., R=6), but of course other embodiments could include other numbers of such time slots. The time slots $TXrn_{k,i}$ are shown in FIG. 3 as time slots $TXrn_{1,1}$, $TXrn_{2,1}$, $TXrn_{3,1}$, $TXrn_{4,1}$, $TXrn_{5,1}$, and $TXrn_{6,1}$ for the time slot assembly $A_1$, time slots $TXrn_{1,2}$, $TXrn_{2,2}$, $TXrn_{3,2}$, $TXrn_{4,2}$, $TXrn_{5,2}$, and $TXrn_{6,2}$ for the time slot assembly $A_2$, and time slots $TXrn_{1,16}$, $TXrn_{2,16}$, $TXrn_{3,16}$, $TXrn_{4,16}$, $TXrn_{5,16}$, and $TXrn_{6,16}$ for the time slot assembly $A_{16}$. Thus, together with the 16 defined channels, and each of the time slots being 1 ms, the embodiment shown in FIG. 3 allocates 96 slots (96 is obtained as 6 time slots times 16 available channels) per 10 ms interval for registered nodes to transmit data.

In a preferred embodiment, the base station 102 transmits data during the time slots $TXbs_i$ by using broadcast. In this manner, each one of the nodes 108, registered or not, is able to receive the transmission of the base station 102 as long as the node is tuned to receive data at the frequency channel at which the base station 102 transmits at the time and as long as the node is within the range of receiving the transmission of the base station 102.

The time slot scheduler is configured to specify the channel sequence which is to be followed by the base station 102 to transmit data within the time slots $TXbs_i$, this channel sequence referred to herein as a "base station sequence" or "BSS". The base station sequence is a sequence of the M channels that the base station 102 has to follow for transmission of data in order to comply with the regulations concerning the use of FHSS. As described above, in order to benefit from the ability to transmit data at higher power, as is allowed for FHSS, according to the current regulations, transmission has to be done by hopping over (i.e. by sequentially transmitting on each of) the sequence of M channels, where the duration of the transmission on each channel is no longer than the dwell time.

In one embodiment, the time slot scheduler could define the base station sequence simply as a consecutive sequence of channels $CH_1$-$CH_M$. However, in other embodiments any other manner for setting the sequence of channels $CH_1$-$CH_M$ may be used. For example, the time slot scheduler may define the base station sequence using a pseudo-random algorithm. In one embodiment, the time of day value from a GPS receiver may be used as a seed for the pseudo-random algorithm.

The base station transmits data in the time slots $TXbs_i$ by following (i.e., transmitting on) the channels of the generated base station sequence. As previously described herein, the regulations dictate how long an entity is permitted to transmit on a single channel before switching to the next channel of the sequence. If the time slots of the time slot assemblies are selected so that two or more consecutive time slots for the base station to transmit data take less time than the permitted dwell time, then it is possible that the base station transmits data on a single channel over the duration of these consecutive two or more time slots. However, even if this is the case, it may be easier to schedule and control in such a way that transmission on a single channel does not exceed the permitted dwell time by simply configuring the base station to switch the transmission channel to transmit on a new channel of the base station sequence during each time slot assembly of the M assemblies. Thus, the base station would transmit on the first channel of the base station sequence within the time assembly $A_1$ (during the designated time slot, in this case $TXbs_1$), then on the second channel of the base station sequence within the time assembly $A_2$ (during the designated time slot, in this case $TXbs_2$), and so on. This way it is easy to check that the base station transmits on each one of the available M channels once over the time slot assemblies $A_1$-$A_M$. The duration of each time slot $TXbs_i$ may be much less than the permitted dwell time, e.g. 1 ms as shown in the example in FIG. 3, however having the base station hopping over the transmission channels that quick may still provide benefits, e.g. in terms of quicker synchronization of new RF nodes to the base station and less interference on/from possible other devices operating on that transmission channel.

After the base station has used all of the channels of a particular base station sequence, in some embodiments the base station may continue transmitting data by starting with the same base station sequence again. However, in other embodiments, the time slot scheduler may define a base station sequence that is different from the last sequence used. This may e.g. be done by changing the value of the seed used for generating the previous sequence and using the changed value of the seed to generate the new pseudo-random base station sequence. Such an embodiment may be particularly advantageous providing a more random access pattern reducing the effect of periodic interference on one or more channels.

The R time slots $TXrn_{k,i}$ within each time slot assembly are used for the registered nodes to transmit data to the base station 102. A node is considered a registered node when it is assigned, by the time slot scheduler, transmission time slots and transmission channels for the node to transmit data to the base station 102 in at least some of the time slot assemblies M. In a preferred embodiment, the assignment information for the registered node specifies transmission time slots and channels for each one of the M time slot assemblies. A single node may be assigned one or more of the R time slots in each time slot assembly for transmission of data, as long as the time slots are of such duration that when the node transmits on one channel (e.g. over the duration of 6 time slots of each time slot assembly), the total transmission time on that channel does not exceed the permitted dwell time.

In a preferred embodiment, for each registered node, the channels assigned to the node for transmission of data in different time slot assemblies are different channels of the M channels. This ensures that each node uses each one of the M available channels once over the duration of the M time slot assemblies $A_1$-$A_M$. This is similar to the preferred embodiment for the base station, described above, in that each time slot assembly both the node and the base station use a different channel to transmit their data. Similar to the explanation provided for the base station, while this embodiment is preferred, it is not mandatory and other embodiments may be envisioned and are within the scope of the present application, when some or all of the registered nodes are assigned to transmit data on the same channel during their assigned time slots in two or more of the consecutive time slot assemblies. As long as transmission channels and time slots are assigned to the registered node in such a manner that at any point in time only a single registered node is configured to transmit data on a particular channel and that transmission by the node on a single channel does not exceed the permitted dwell time which may be specified for the use of FHSS, any manner for assigning time slots and channels to the registered nodes is within the scope of the present invention.

The time slot scheduler is configured to specify the channel sequence which is to be followed by each of the registered nodes 108 to transmit data within the time slots $TXrn_{k,i}$, this channel sequence referred to herein as a "node sequence" or "NS". The node sequence is a sequence of the M channels that the registered node has to follow for transmission of data in order to comply with the regulations concerning the use of FHSS. The node sequences may be completely different for each one of the registered nodes. As used herein, two sequences are considered "different" when the order of the sequence members is different. For example, sequence $CH_1$, $CH_2$, $CH_3$, . . . , $CH_{M-1}$, $CH_M$ of the M channels $CH_1$-$CH_M$ is different from sequence $CH_2$, $CH_3$, $CH_4$, . . . , $CH_M$, $CH_1$ of the same M channels. The node sequence for one or more of the registered nodes may be but does not have to be different from the base station sequence followed by the base station at a particular time.

Similar as for the base station sequence, in one embodiment, the time slot scheduler could define the node sequence for a particular node simply as a consecutive sequence of channels $CH_1$-$CH_M$. However, in other embodiments any other manner for setting the sequence of channels $CH_1$-$CH_M$ may be used. For example, the time slot scheduler may define the node sequence using a pseudo-random sequence generator. In such an embodiment, using the node ID as a seed for generating the node sequence ensures that each node has a different node sequence.

Figure 4:
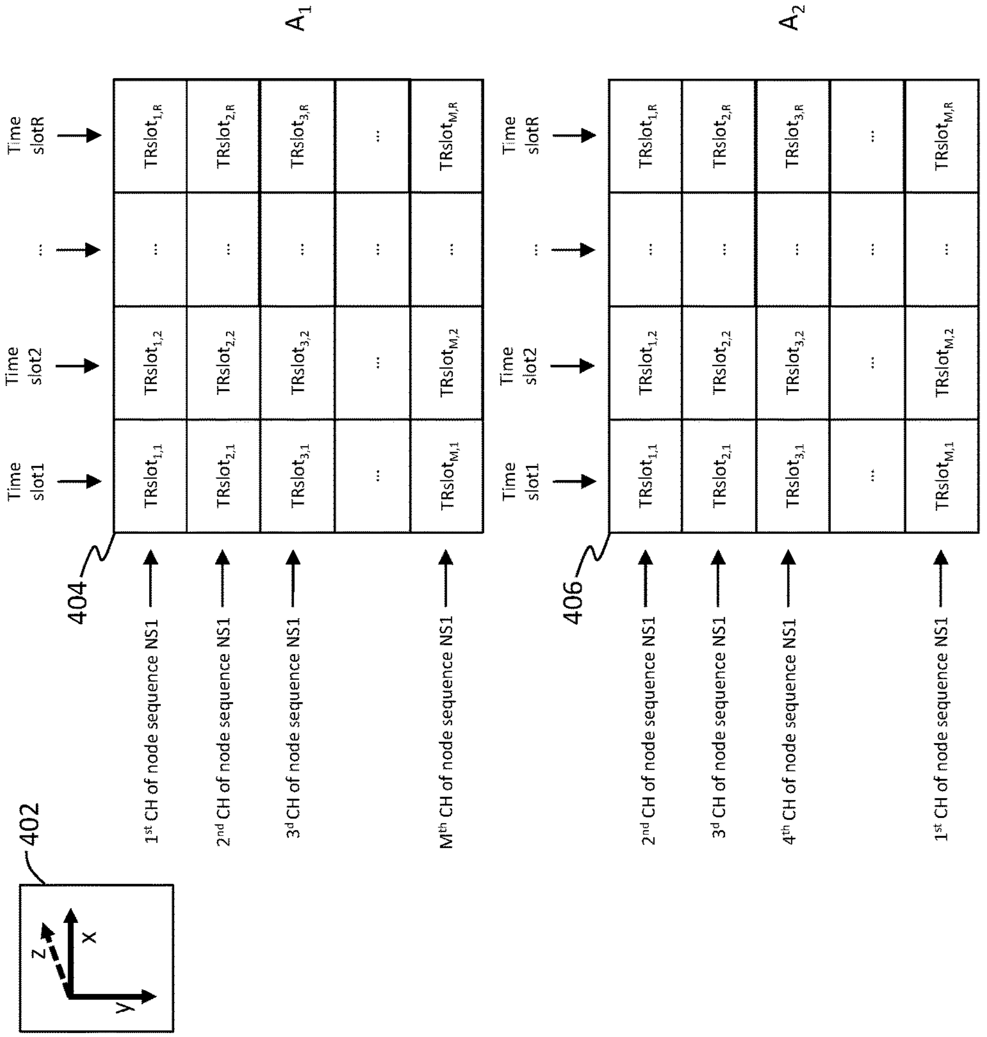
FIG. 4 provides a schematic illustration of assignment of transmission time slots and channels to registered nodes, according to one embodiment of the present invention.

FIG. 4 provides a schematic illustration of assignment of transmission time slots and channels to registered nodes, according to one embodiment of the present invention. According to this particular example of registered node assignment, a 3D matrix is created. The x, y, and z dimensions of the 3D matrix are R, M, M, respectively, for the x, y, and z coordinates being as illustrated in the inset 402 on FIG. 4, with the x-axis being the horizontal axis in the plane of the drawing, the y axis being the vertical axis in the plane of the drawing, and the z axis being perpendicular to the plane of the drawing, as illustrated with the z axis being shown as a dashed line. The variables R and M are used herein consistently with the rest of the present description, so all of the considerations with respect to the R time slots and the M channels provided above are applicable here as well.

This particular example is provided for the embodiment where the base station uses a particular base station sequence to transmit data on a different one of the M channels $CH_1$-$CH_M$ in each of the time slot assemblies $A_1$-$A_M$, while each of the registered nodes uses a particular node sequence to transmit data on a different one of the M channels $CH_1$-$CH_M$ in each of the M time slot assemblies $A_1$-$A_M$. Thus, from one time slot assembly to the next, both the base station and each of the registered nodes switch the transmission channel to the next channel in their respective sequences, ensuring that over the duration of the M time slot assemblies $A_1$-$A_M$ each of the transmitting entities (i.e., the base station and each of the registered nodes) have used each channel of the M channels $CH_1$-$CH_M$ exactly once.

Of the 3D R×M×M matrix, the x direction is used to refer to the sequential time slots of the R time slots designated by the time slot scheduler in the time slot schedule for the registered nodes to transmit data to the base station, the y direction is used to refer to the M channels of a node sequence, while the z direction is used to refer to the M channels of a base station sequence.

In order to simplify the explanation of this example, instead of showing the matrix in the 3D, two planes of the M planes in the z direction of the 3D matrix are illustrated—the 2D table 404 and the 2D table 406.

The table 404 illustrates the 2D plane of the 3D matrix as taken for z=1. Since in this example the base station and each of the nodes switch their transmission channels from one time slot assembly to the next, a term "channel sequence index" (CSI) could be used to identify a particular time slot assembly $A_i$ of the assemblies $A_1$-$A_M$. Thus, z=1 means that CSI=1, which means that the 2D table 404 refers to the transmission schedule for the time slot assembly $A_1$.

The table 406 illustrates the 2D plane of the 3D matrix as taken for z=2 (i.e., CSI=2), which means that the 2D table 406 refers to the transmission schedule for the time slot assembly $A_2$. Tables for CSI=3, 4, 5, . . . M similar to the tables 404 and 406 are included as subsequent planes extending in the z-direction, which for simplicity are not shown in FIG. 4.

In this specific example, a sequence NS1 of different ones of the M channels $CH_1$-$CH_M$ is defined, which may or may not be the same as or related to the base station sequence used by the base station over the same M time slot assemblies. As shown in the table 404, rows 1-M of the table refer to transmission at each one of the channels of the sequence NS1 (i.e., as can be seen on the left side of the table 404, the first row of the table 404 refers to transmission on the $1^{st}$ channel of NS1, the second row refers to transmission on the $2^{nd}$ channel of NS1, and so on), while columns 1-R refer to transmission in each one of the R time slots within a single time slot assembly.

Intersection of rows and columns in the table 404 designates so-called "transmission slots", shown as $TRslot_{c,k}$ (TRslot="Transmission slot"), where index "c" refers to the row number in the table, thus indicating the transmission channel, while the index "k" as refers to the sequential number of the time slot within the R time slots (the same as for the variable $TXrn_{k,i}$), thus indicating the transmission time. In each transmission slot $TRslot_{c,k}$ of the table 404 an identification of a registered node may be stored, thus providing a schedule for the first time slot assembly A1 as to at which channel and at which time the registered nodes may transmit data to the base station. For example, consider that the transmission slot $TRslot_{1,1}$ stores an identification of registered node A, transmission slot $TRslot_{2,1}$ stores an identification of registered node B, transmission slot $TRslot_{3,1}$ stores an identification of registered node C, transmission slot $TRslot_{1,2}$ stores an identification of registered node D, and transmission slot $TRslot_{2,2}$ stores an identification of registered node E. Each of the nodes A-E is a different one of the plurality of nodes 108 and they are "registered" because they are assigned transmission times and channels in the 3D matrix. Nodes A, B, and C being assigned the transmission slot $TRslot_{1,1}$, $TRslot_{2,1}$, and $TRslot_{3,1}$, respectively, means that, within the time slot assembly $A_1$, nodes A, B, and C are allowed to transmit data to the base station on the $1^{st}$, $2^{nd}$, and $3^{d}$ channels, respectively, of the channel sequence NS1 over the duration of the first time slot of the R time slots. Nodes D and E being assigned the transmission slot $TRslot_{1,2}$ and $TRslot_{2,2}$, respectively, means that, within the time slot assembly $A_1$, node D is allowed to transmit data to the base station on the $1^{st}$ channel of the channel sequence NS1 over the duration of the second time slot of the R time slots, while node E is allowed to transmit data to the base station on the $2^{nd}$ channel of the channel sequence NS1 over the duration of the same second time slot of the R time slots. The assignment of nodes A-E ensures that if more than two nodes are transmitting their data in the same time slot, then their transmissions do not interfere because each of these nodes transmit on a different channel—e.g. nodes A, B, and C each can transmit data to the base station in the time slot 1 of the R time slots, however, they are assigned to do so by using different channels of the sequence NS1. Similarly, the assignment of nodes A-E ensures that if more than two nodes are transmitting their data on the same channel, then their transmissions do not interfere because each of these nodes transmits at a different time slot—e.g. nodes A and D each can transmit data to the base station using the $1^{st}$ channel of the sequence NS1, however, they are assigned to do in different time slots of the R available time slots.

In the manner described above, it is in principle possible to assign M*R nodes a transmission slot within a single time slot assembly. When M=16 and R=6, this means that 96 different registered nodes could transmit their data to the base station within a single time slot assembly. While assigning every single transmission slot of the available M*R slots to a registered node would allow the maximum use of the available time slots R and the available channels M, of course, not each transmission slot has to be assigned to a node. Furthermore, the assignment table 404 may contain ID of the same node in more than one transmission slots, as long as the same ID is not encountered more than once in a single column (i.e., the same ID may be encountered two or more times in the table 404 only if that ID is encountered in different columns). Thus, the same ID may be encountered multiple times in a single row of the table but not in a single column. This would allow a single node to transmit data for longer period (longer than the duration of a single time slot of the R time slots) during a single time slot assembly. For example, if node F is registered by being assigned to the transmission slots $TRslot_{M,1}$, $TRslot_{M,2}$ and $TRslot_{M,3}$ (in this case R is equal to or greater than 3), then it means that node F can transmit data on the $M^{th}$ channel of the sequence NS1 over the duration of the first, second, and third time slots of the R time slots available in a single time slot assembly.

Now, moving to the table 406, in the exemplary assignment illustration of FIG. 4, the table 406 contains the same transmission slots $TRslot_{c,k}$, as described above. In fact, in this example, the node IDs stored in these transmission slots are envisioned to be the same IDs in the same transmission slots as in the table 404. What is different in the table 406 is the sequence of channels to which the rows of the table 406 refer. In a simple embodiment, the sequence of channels for the rows in the table 406 may be simply shifted by one, as compared with the sequence of channels for the rows in the table 404. This is illustrated on the left side of the table 406, from which it is clear that now the first row of the table refers to transmission on the $2^{nd}$ channel of NS1, the second row refers to transmission on the $3^{d}$ channel of NS1, and so on, where the row before last refers to transmission on the $M^{th}$ channel of NS1 and the last row refers to transmission on the $1^{St}$ channel of NS1. As a result of such an assignment, node A is now assigned to transmit data to the base station in the first time slot of the next time slot assembly, assembly $A_2$, in a different channel than in the previous time slot assembly $A_1$. In the time slot assembly A2 node A can transmit data in the first time slot on the $2^{nd}$ channel of the sequence NS1.

The teaching provided above can be extended for the remaining M−2 tables of the R×M×M matrix in the z direction (i.e., the tables besides the tables 404 and 406 shown in FIG. 4), where for each of those tables provides an assignment for a particular time slot assembly of the assemblies $A_3$-$A_M$.

Provided that the sequence of channels to which the rows of the subsequent M−2 tables 406 refer continues shifting by one, node A would be assigned to transmit during the first time slot of the time slot assembly $A_3$ on the $3^{d}$ channel of the sequence NS1, during the first time slot of the time slot assembly $A_4$ on the $4^{th}$ channel of the sequence NS1, and so on. In this manner, node A follows the sequence NS1 for transmission in the first time slot of the available R time slots over the M time slot assemblies $A_1$-$A_M$. In this manner, over the M time slot assemblies $A_1$-$A_M$ node A has transmitted on each one of the M channels exactly once.

Similarly, node B would be assigned to transmit during the first time slot of the time slot assembly $A_3$ on the $4^{th}$ channel of the sequence NS1, during the first time slot of the time slot assembly $A_4$ on the $5^{th}$ channel of the sequence NS1, and so on. In this manner, node B is also ensured to have transmitted on each one of the M channels exactly once over the M time slot assemblies $A_1$-$A_M$, however node B follows a different sequence of channels than node A—namely, node B follows the sequence of channels: $2^{nd}$ channel of the sequence NS1, $3^{d}$ channel of the sequence NS1, . . . $M^{th}$ channel of the sequence NS1, $1^{st}$ channel of the sequence NS1. Thus, each of the registered nodes assigned to the transmission slots in the same column (i.e., nodes assigned to transmit within the same time slot of the R time slots) follows a different sequence of M channels for transmission over the M time slot assemblies $A_1$-$A_M$ (even though these different sequences may be related to the sequence NS1—the relation in this example being that the sequences are shifted with respect to one another and with respect to the sequence NS1). On the other hand, each of the registered nodes assigned to the transmission slots in the same row (i.e., nodes assigned to transmit on the same channel within each time slot assembly) follow the same sequence of M channels for transmission over the M time slot assemblies $A_1$-$A_M$.

The description of the assignment of transmission time slots and channels to registered nodes provided above with respect to FIG. 4 is just one possible example of many different possibilities, all of which are within the scope of the present invention, as long as these assignments satisfy the requirements that the registered nodes transmit data to the base station only within the R time slots designated for such transmission within each time slot assembly, each of the registered nodes follows a sequence of M different channels of the channels $CH_1$-$CH_M$ for transmission of data (possibly limiting the transmission on each channel to a certain time period, if dwell time restrictions apply), if two or more registered nodes are assigned to transmit data in the same time period, these nodes are assigned to transmit on their respective (i.e., different) channels.

Returning back to FIG. 3, optionally, each time slot assembly $A_i$ also includes U time slots for the unregistered nodes to transmit data, $TXun_{j,i}$ (TXun="Transmission (TX) by unregistered node"), where the index "j" as used herein, also possibly with other variables, refers to the sequential number of the time slot within the U time slots, where U is an integer equal to or greater than 1. Such an embodiment would be particular beneficial in order to allow the unregistered nodes to request registration, i.e. to request assignment of times/channels for transmission of data by the nodes within one of the time slots R of the time slot assemblies $A_1$-$A_M$. This embodiment is optional because registration of the nodes with the time slot scheduler could also be implemented in other manners, such as e.g. pre-configuring the system 100 upon deployment in a particular setting, where all of the nodes 108 which could possibly be used are assigned times/channels for transmission of data ahead of time, possibly irrespective of whether such nodes then require communication with the base station 102 or not. A person skilled in the art could envision other ways for registering the nodes with the time slot scheduler. The example of FIG. 3 illustrates each time slot assembly as having 3 time slots for the unregistered nodes to transmit data (i.e., U=3), but of course other embodiments could include other numbers of such time slots. The time slots $TXun_{j,i}$ are shown in FIG. 3 as time slots $TXun_{1,1}$, $TXun_{2,1}$, and $TXun_{3,1}$ for the time slot assembly $A_1$, time slots $TXun_{1,2}$, $TXun_{2,2}$, and $TXun_{3,2}$ for the time slot assembly $A_2$, and time slots $TXun_{1,16}$, $TXun_{2,16}$, and $TXun_{3,16}$ for the time slot assembly $A_{16}$. Thus, together with the 16 defined channels, and each of the time slots being 1 ms, the embodiment shown in FIG. 3 allocates 48 slots (48 is obtained as 3 time slots times 16 available channels) per 10 ms interval for unregistered nodes to transmit data.

In an embodiment, requesting registration may be carried out as follows. For an unregistered node to become registered, the node may use a pseudorandom algorithm, e.g. seeded by the unique node ID of the node to select a slot from the unregistered space (i.e., one of the time slots $TXun_{j,i}$) to send an 'announce' packet to the base station 102 requesting registration. The base station 102 forwards this packet to the time slot scheduler who can then decide to either allow registration for this node by assigning it one or more time slots in the registered space (and have the base station 102 provide this information to the requesting node, e.g. the next time the base station transmits data in the next time slot assembly) or deny registration by having the base station 102 transmit information that registration for this node was denied.

The time slot schedule as described above as well as assignment information for the registered nodes is to be distributed from the base station 102 to the nodes 108. This may be done by means of the base station 102 transmitting this information within the time slots of the time slot assemblies which are designated for a base station transmission (i.e., within the time slots $TXbs_i$). For simplicity, assume that there is only one time slot per time slot assembly for the base station to transmit data. Further, the following discussion (FIGS. 5-6) will be provided for the particular example discussed above where the base station 102 uses a new transmission channel, of the base station sequence of channels, for transmission during each of the M time slot assemblies $A_1$-$A_M$, with M=16 and R=6.

In one embodiment, the base station 102 may be configured to transmit data, preferably by broadcast, as packets in the form of a predefined data structure. In order to be able to interpret the data received from the base station 102, nodes 108 are configured to have sufficient information about the data structure used for the base station packets.

Figure 5:
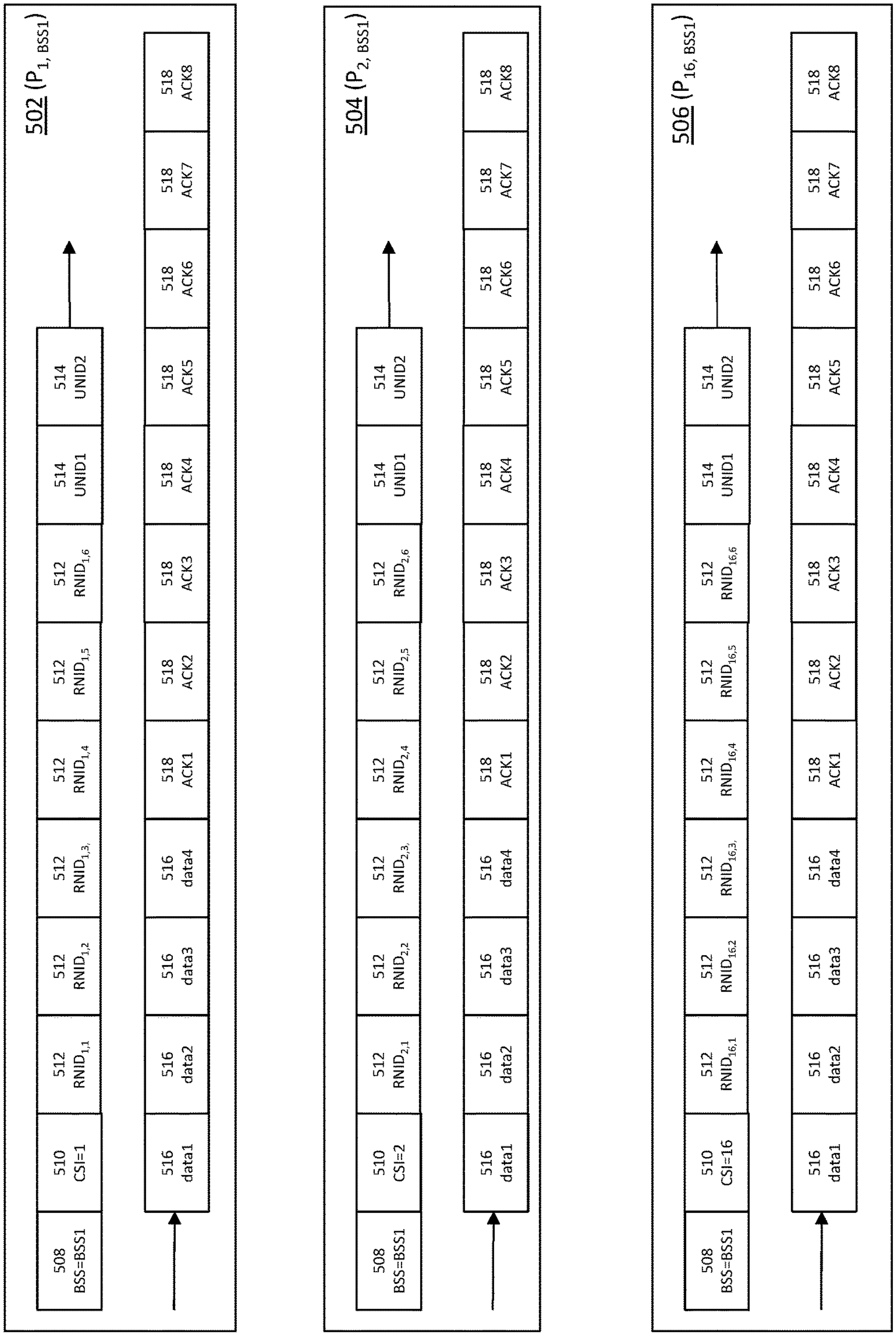
FIG. 5 provides a schematic illustration of exemplary base station packets, according to one embodiment of the present invention.

FIG. 5 provides a schematic illustration of exemplary base station packets 502, 504, and 506, according to one embodiment of the present invention. Packet 502 is the packet $P_{1,BSS1}$ that the base station 102 transmits during the first time slot assembly $A_1$ of the 16 time slot assemblies $A_1$-$A_{16}$ when the base station is following a particular base station sequence, BSS1. Packet 504 is the packet $P_{2,BSS1}$ that the base station 102 transmits during the second time slot assembly $A_2$ of the 16 time slot assemblies $A_1$-$A_{16}$ when the base station is following the sequence BSS1. Packet 506 is the packet $P_{16,BSS1}$ that the base station 102 transmits during the last time slot assembly $A_{16}$ of the 16 time slot assemblies $A_1$-$A_{16}$ when the base station is following the sequence BSS1. From the description of these packets, a person skilled in the art would be able to easily recognize how the rest of the packets—both for the time slots assemblies in this set of the time slot assemblies $A_1$-$A_M$ (i.e., the set where the base station follows the sequence BSS1) as well as for the other sets of M time slot assemblies (e.g. the set where the base station follows the sequence BSS2, which base station packets are shown in FIG. 3 as packets $P_{1,BSS2}$ and $P_{2,BSS2}$ in the time slot assemblies 310 and 312) would be structured and what data they would contain. It should also be noted that the packets 502, 504, and 506 typically also contain other data/fields, not shown in FIG. 5, such as e.g. a header. The description of the packets of FIG. 5 is related mainly to the description of the payload contained in the packets transmitted by the base station 102.

As shown, the base station packets include at least one field, shown as a field 508 within each of the packets 502, 504, and 506, providing an identification of the current base station sequence followed by the base station 102 for transmission of data, in this case the sequence BSS1. Such an identification may, e.g., comprise a channel sequence seed value (e.g. a value from 0 to 65535) used by the pseudorandom algorithm to generate the sequence BSS1. Including this identification in the base station packets allows the nodes that receive the packets to re-create the sequence of channels followed by the base station, so that the nodes can then receive subsequent packets from the base station by configuring their receivers to receive data on the channels where the base station is going to transmit according to the determined base station sequence.

As also shown, the base station packets may, optionally, include a field, shown as a field 510 in each of the packets 502, 504, and 506, providing an identification of the current channel sequence index (i.e., the CSI indicating which channel within the base station sequence BSS1 the base station is using to transmit the present packet, so this could be an index of 1 to 16 since M=16 in this example). This field is optional because the nodes may also derive this information on their own by simply identifying on which channel the node has received the packet.

The base station packets may further include one or more fields, shown in the example of FIG. 5 as six fields 512 within each of the packets 502, 504, and 506, containing assignment information for at least some of the registered nodes. Different manners may be envisioned for the provision of the assignment information from the base station 102 to the nodes 108, all of which are within the scope of the present invention. For example, in one embodiment, all of the current assignment information for all of the registered nodes may be divided equally over the M time slot assemblies $A_1$-$A_M$ and, thus, transmitted within the duration of a single set of M time slot assemblies. Dividing all of the assignment information among the M time slot assemblies allows minimizing length of a base station packet as each base station packet only contains information on only part of the registered nodes. In such a case, it takes a full set of M time slot assemblies $A_1$-$A_M$ to transmit assignment information on all of the registered nodes (for the example illustrated in FIG. 3—it takes 160 ms to transmit all of the assignment information). In a further embodiment, in the next set of M time slot assemblies the assignment information may be sent in this manner again. In such an embodiment, the assignment information is sent even though at least some of the registered nodes may already be in possession of their assignment information. Such an embodiment may be advantageous in case e.g. assignment information changes because it would allow the registered nodes to periodically (i.e., when new base station packet with their assignment information is received) confirm that the assignment information they have is still valid and, if necessary, update that information. In other embodiments, assignment information may be sent on as-needed basis, i.e. only when a new node has been registered. Such an embodiment may be advantageous because transmitting less data (i.e., not transmitting all of the assignment information in every set of the M time slot assemblies) decreases network traffic load.

The six fields 512 illustrated in FIG. 5 illustrate a particularly advantageous embodiment of sending assignment information for the nodes when the assignment of transmission time slots and channels is done as described in the example of FIG. 4. As described above, in the example of FIG. 4, the transmission slots $TRslot_{c,k}$ contain individual node IDs and transmission is organized in such a manner that, from one time slot assembly to the next, within at least a single set of time slot assemblies $A_1$-$A_M$, a transmission slot assigned to a particular registered node remains the same. Thus, such a schedule may identify 96 nodes as registered nodes by assigning them to one of the 96 available transmission slots (for M−16, R=6). The assignment information for the various registered nodes may then be transmitted within the base station packets row by row (where "rows" refer to the rows illustrated in FIG. 4), where each base station packet of the set of the M time slot assemblies includes node IDs $RNID_{c,k}$ (RNID="Registered Node Identification") contained in a different row of the transmission slots table $TRslot_{c,k}$ (RNID with a particular index refers to the identification of a node stored in a transmission slot TRslot with the same index). Thus, as shown in the packet 502, the first packet $P_{1,BSS1}$ contains the node IDs $RNID_{1,1}$ to $RNID_{1,6}$, distributed evenly over the six fields 512, the nodes IDs $RNID_{1,1}$ to $RNID_{1,6}$ stored in the transmission slots $TRslot_{1,1}$ to $TRslot_{1,6}$, as shown in FIG. 4 (i.e. the first row of the tables shown in FIG. 4, for R of FIG. 4 being equal to 6). As shown in the packet 504, the second packet $P_{2,BSS1}$ contains the node IDs $RNID_{2,1}$ to $RNID_{2,6}$, distributed evenly over the six fields 512, the nodes IDs $RNID_{2,1}$ to $RNID_{2,6}$ stored in the transmission slots $TRslot_{2,1}$ to $TRslot_{2,6}$, as shown in FIG. 4 (i.e. the second row of the tables shown in FIG. 4). As shown in the packet 506, the last packet $P_{16,BSS1}$ contains the node IDs $RNID_{16,1}$ to $RNID_{16,6}$, distributed evenly over the six fields 512, the nodes IDs $RNID_{16,1}$ to $RNID_{16,6}$ stored in the transmission slots $TRslot_{16,1}$ to $TRslot_{16,6}$, as shown in FIG. 4 (i.e. the second row of the tables shown in FIG. 4, for M of FIG. 4 being equal to 16).

In this manner, for 16 frequency channels, and the time slot schedule as illustrated in FIG. 3 (i.e. with 1 time slot for base station packets, 6 time slots for transmission from registered nodes, and 3 time slots for transmission from unregistered nodes, each time slot being 1 ms long), it takes 16*10 ms=160 ms to transmit all of the current assignment information for all of the registered nodes.

The base station packets may further include one or more fields, shown in the example of FIG. 5 as two fields 514 within each of the packets 502, 504, and 506, containing identifications of the nodes that have been denied registration (i.e., nodes which have been denied a transmission slot in the time slot schedule for sending data to the base station). The fields 514 of each base station packet in FIG. 5 are shown to contain each a single ID of an unregistered node that has been denied registration, shown as UNID1 and UNID2 (UNID="Unregistered Node Identification"). However, in other embodiments, these fields may contain more than a single identification of a node that has been denied registration.

The base station packets may further include one or more fields, shown in the example of FIG. 5 as four fields 516 within each of the packets 502, 504, and 506, each containing data destined for one or more of particular registered nodes. Each of the fields 516 of each base station packet in FIG. 5 is shown to contain data to a single registered node, shown as data1, data2, data3, and data4, respectively. However, in other embodiments, each of these fields may contain data destined to more than a single registered node. As used herein, the term "destined" in the context of "data destined for a node" is used to describe data that is supposed to be communicated from the base station 102 specifically to that particular node. Such a destination may be identified within the fields 516 e.g. by providing a unique identification of the node in association with the actual data that it to be communicated to that node. Alternatively, such a destination may be identified by providing an identification of the transmission slot assigned to that node, as this may be shorter than e.g. providing the unique serial number of the node. For example, in order to identify that data in the first field 516 of the packet $P_{1,BSS1}$ is destined to the node B, that field may contain "$TRslot_{2,1}$" which identifies node B. Since the registered nodes are in possession of their assignment information, they know the transmission slots assigned to them and will, therefore, be able to detect data destined for them when it is identified in this manner. The data destined to the individual registered nodes as provided in the fields 516 may contain CAN packet data relating to e.g. lap time information to be displayed on the vehicle onboard display. In an embodiment, the data provided in each of the fields 516 (possibly among the different time slot assemblies) contains a packet sequence number of that data, e.g. if the data destined to a single registered node is transmitted divided among a series of base station packets. In this manner the specified registered node may be able to place the data received in the series of packets in the right order and/or check whether it has received the data from all packets of the series of packets that the base station transmitted.

Still further, the base station packets may further include one or more fields, shown in the example of FIG. 5 as eight fields 518 within each of the packets 502, 504, and 506, each containing acknowledgements of the data received by the base station 102 from the particular nodes. Each of the fields 518 of each base station packet in FIG. 5 is shown to contain data to a single registered node, shown as ACK1-ACK8, respectively (ACK="Acknowledgement"). However, in other embodiments, each of these fields may contain acknowledgements for data received from more than a single node. Identifications of the nodes to which the acknowledgement relates may be done in one of the manners described in association with the fields 516.

In an embodiment where the data sent to the base station 102 from the registered nodes 108 is a sent in a series of packets, the acknowledgements in the fields 518 preferably contain packet sequence identification, thus providing acknowledgement of a receipt of a particular packet.

In an embodiment, the acknowledgements in the fields 518 comprise CAN packet data acknowledgements.

The registered nodes may also be configured to send their data to the base station in a particular format (not shown in the Figures). In one embodiment, a packet that may be sent by a registered node to the base station may include one or more fields containing one or more of the following information: identification of the node (e.g. node serial number of reference to the transmission slot assigned to the node), CAN packet data together with packet sequence number (for resending data if it was not received), CAN packet data without sequence number (for data that does not need to be resent if lost, such as e.g. current GPS position), and CAN packet sequence number ACK (indicating to RF base station that a certain CAN packet was received).

Similarly, the unregistered nodes may also be configured to send their data to the base station in a particular format (not shown in the Figures). In one embodiment, a packet that may be sent by an unregistered node to the base station may at least include a field containing an identification of the node, in the form of e.g. the serial number of the node. The base station 102 may be configured to interpret receipt of such a packet, within the time allocated for the unregistered nodes to send their data, as an indication that the node wishes to obtain a transmission slot (i.e., to become registered).

Figure 6:
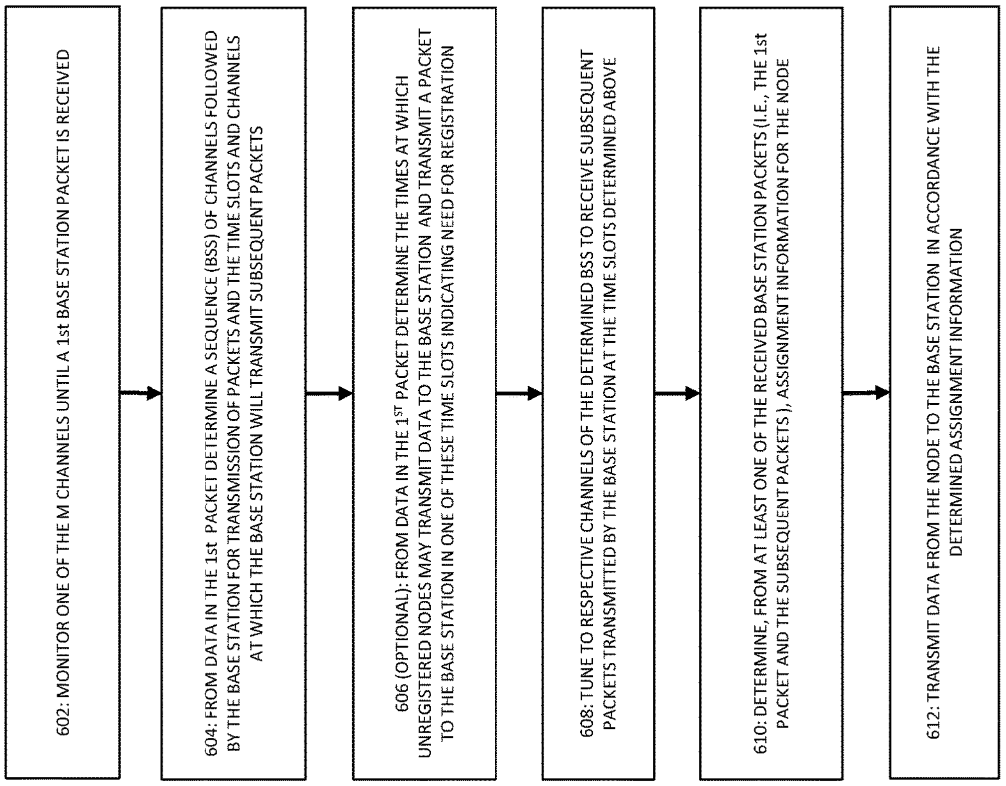
FIG. 6 is a flow diagram of method steps which may be performed by one of the plurality of nodes, according to one embodiment of the present invention.

FIG. 6 is a flow diagram of method steps which may be performed by one of the plurality of nodes 108, according to one embodiment of the present invention. While the method steps are described in conjunction with the elements illustrated in FIGS. 1 and 2, persons skilled in the art will recognize that any system configured to perform the method steps, in any order, is within the scope of the present invention.

The method may begin with a step 602 where a node that is not aware of the assignment information assigned to it starts monitoring one of the available M channels. The node may not be aware of its assignment information e.g. either because the node is an unregistered node and no assignment information exists for the node or because although the node is already registered in the sense that there is a transmission slot assigned to it by the time slot scheduler, the node is not (yet) in the possession of its assignment information. Monitoring is done by the node ensuring that the RF receiver of the node is activated and tuned to the channel to be monitored. The channel is monitored in order for the node to receive a packet from the base station 102. Thus, the node is configured to monitor the channel until such a first base station packet is received. When the base station transmits its packets by hopping over a sequence of M channels by transmitting on a different channel within the M time slot assemblies $A_1$-$A_M$, the node should be able to receive its first packet from the base station in the time period that the M time slot assemblies $A_1$-$A_M$ take. For the example illustrated in FIG. 3, this would be 160 ms (10 ms per time slot assembly times 16 time slot assemblies because M=16).

In an embodiment, monitoring on a single channel for the first base station packet may be limited—e.g. the node may be configured to monitor a particular channel for a specified period of time and, if a packet from the base station is still not received in this time period, then the node is configured to switch to another channel and continue monitoring there. Such an embodiment could ensure that in case for some reason the node is not able to receive base station packets on a particular channel at a particular time, the node is still able to receive the base station packet by switching to another channel.

It should be noted that in the context of method steps of FIG. 6, the word "first" in step 602 is used to describe one of the base station packets received by the node that the node will use for determining the sequence of channels and the timing that the base station will follow to transmit one or more of subsequent packets. In this context, the word "first" does not have any relation to the order of the packet within e.g. the sequence of packets sent by the base station within the M time slot assemblies $A_1$-$A_M$ (i.e., this packet is not necessarily the packet sent by the base station in the first time slot assembly $A_1$). Even though the node would typically continue with other steps of FIG. 6 as soon as it receives the very first packet from the base station, the word "first" in step 602 does not require this. In fact, it could be the case that the node decides, for some reason, not to use the very first packet received from the base station (e.g. because the packet is corrupted) but wait for the receipt of another packet to continue with the following steps of FIG. 6. Thus, the word "first" in step 602 merely indicates that for the monitoring node this is the first packet received from the base station that the node will use for performing the subsequent method steps of FIG. 6. Such a first base station received by the node could, in fact, be the last packet transmitted by the base station within the M time slot assemblies $A_1$-$A_M$, if the node happens to be monitoring the last one of the M channels that the base station follows at that time.

The node is at least in the possession of information indicative of the data structure used by the base station to construct its packets to be transmitted (such as e.g. illustrated in FIG. 5). Therefore, once the node has received a first base station packet, the node can use the data contained in the packet to synchronize itself to the transmission of the base station and start receiving subsequent packets from the base station transmitted on different channels. Namely, in step 604, from the content of the first base station packet received, the node is able to determine the base station sequence currently followed by the base station as well as the time slots and the channels at which the base station will transmit subsequent packets.

The node can make the first determination because, as illustrated e.g. in FIG. 5, the base station packets contain an identification of the current sequence of channels followed by the base station for transmission of packets. E.g., if the first packet received includes the value of the seed that was used to generate the current BSS, then the pseudorandom algorithm within the node may use that seed to re-create the current BSS. The node may also then determine the CSI of the received packet. This may be done e.g. by obtaining that value from one of the fields of the base station packet specifically designated for transmission of this value (e.g. the field 510 described above) or because the node knows on which channel the node received the packet, so the node can determine the CSI of that channel within the determined BSS.

Once the node has determined the current BSS and the CSI for the transmission of the first packet received by the node, the node can determine on which channel the base station will transmit the next base station packet by simply determining which channel is the next within the determined BSS when CSI of the first packet is increased by one. In this manner, the node is able to determine the rest of the transmission channels that the base station will use for transmission of the packets within the current BSS.

The node is also in possession or has access to information relating to structure of the time slot schedule being used (i.e., the node has information on the nature and duration of the time slots as shown in FIG. 3). For example, the node may be preprogrammed with such information. Since the node can determine the time during which the first base station packet was received and since the node has information how often the base station sends its packets, the node can determine the times when the base station will send the subsequent packets. For example, for the 10 ms time slot assemblies as illustrated in FIG. 3, the node can determine that the next base station packet will be transmitted by the base station 9 ms after the first packet was received.

In step 606 the node may, similarly to the time determination of step 604, determine the times at which unregistered nodes are prescribed to transmit data (prescribed by the time slot schedule), e.g. registration requests, to the base station. If the node is unregistered node, it may then transmit a registration request to the base station in accordance with the determined prescribed times for doing so. In an embodiment, a registration request may comprise a data packet comprising a serial number providing the unique identification of the node. In an embodiment, the unregistered node may be configured to transmit its registration request to the base station using for transmission one channel of the available M channels determined using a pseudorandom algorithm. Randomly selecting a channel for sending a registration request may minimize possible interference between different unregistered nodes sending their registration requests or other data to the base station.

The step 606 is optional because, in some embodiments, registration may be requested in other manners. For example, registration may be requested for all the possible nodes upon e.g. deployment of the system. In such an implementation, the node does not need to actively request registration, but, rather, only to listen to the base station packets to determine its assignment information.

After the node has determined the times and channels with the base station 102 will be broadcasting further, it can, in step 608, configure its receiver to tune in to the determined channels at the determined times to receive subsequent packets transmitted by the base station. The node can now "follow" the base station in time and channels for receiving the subsequent packets.

In step 610, the node can determine from one or more of the received packets (i.e., the first packet received in step 602 and the subsequent packets received in step 608) the assignment information for the node. In an embodiment where all of the assignment information for all of the registered nodes is transmitted over M time slot assemblies $A_1$-$A_M$, divided evenly over the time slot assemblies, and then transmitted again in the subsequent sets of M time slot assemblies $A_1$-$A_M$, the node should be able to determine its assignment information after receiving base station packets transmitted within M time slot assemblies. These M time slot assemblies are not necessarily time slot assemblies $A_1$-$A_M$ of a single set of M time slot assemblies. For example, if the first base station packet received by the node is the one sent by the base station in the time slot assembly $A_{M-1}$, and the assignment information for the node was transmitted within the base station packer sent by the base station in the time slot assembly $A_{M-2}$, then the node just missed it and will have to receive base station packets in the next set. Namely, the node will receive base station packets transmitted within the time slot assemblies $A_1$-$A_{M-3}$ and then finally be able to obtain its assignment information after it received the base station packet transmitted in the time slot assembly $A_{M-2}$. In this manner, the node can determine its assignment information from M base station packets transmitted within M time slot assemblies: $A_{M-1}$ and $A_M$ of the first set and $A_1$-$A_{M-2}$ of the following set.

Once the node has obtained its assignment information, it is able to start transmitting data to the base station in accordance with that information, i.e. at the times and on the channels prescribed by the assignment information.

In an embodiment, at least some of the data communicated between the nodes 108 and the base station 102 is encrypted, e.g. using AES128 encryption.

In an embodiment, the packets transmitted by the base station and by the nodes maybe optimized, in terms of their size and transmission format, for transmitting CAN bus packets. In such an embodiment, a base station packet may be structured as follows: channel sequence seed value (seed) (2 bytes), channel sequence index (CSI) (1 byte), 4× transmission slot assignment information (4×3 bytes), 2× transmission slot denial indication (2×3 bytes), 4×CANpacket+transmission slot+message ID (4×14 bytes), 8× transmission slot+message ID ACK (8×2 bytes). Such a structure comes out to a total of 93 bytes. In order to encrypt such a packet with AES128 encryption, the packet is then padded to 96 bytes. At 1 Mbit transmission speed that results in 1 microsecond per bit for 768 microseconds (i.e., 96*8) of total transmission time. Similarly, a node packet for the node to transmit in an assigned transmission slot may be structured as follows: serial number of the node (3 bytes), transmission slot number (1 byte), packet sequence number (1 byte), 2×CANpacket without message ID (2×10 bytes), CAN-packet with message ID (11 bytes), message ID ACK (3 bytes). In order to encrypt such a packet with AES128 encryption, the packet is then padded to 48 bytes. At 1 Mbit transmission speed that results in 384 (i.e., 48*8) microseconds of total transmission time.

Certain general remarks apply to the descriptions provided above related to other embodiments that may be envisioned and are within the scope of the present invention.

First of all, while in the description above all of the time slot assemblies $A_i$ are described as having the same structure (i.e., the same kind of time slots designated for the same purposes), in other embodiments time slot assemblies $A_i$ may differ from one another in some specific manner. For example the time slots within the different time slot assemblies don't have to be of the same length, only some and not all of the time slot assemblies may contain time slots for the base station and/or the registered nodes to transmit data, and/or the base station and/or the registered nodes may be configured to hop to another transmission channel in an irregular manner (e.g. not upon each new time slot assembly, but after one time slot assembly switch to a new transmission channel to transmit during the following two assemblies, then switch to a new channel to transmit during the following one assembly, then switch again to transmit on that channel during the following two assemblies, and so on). As long as the nodes have the information on or can derive based on one of the received base station packets how the different time slot assemblies are structured, they will be able to synchronize themselves and communicate data to the base station at the correct times and on the correct channels in accordance with the present invention.

Second, similarly for the base station packets—while the packets are described above as having the same data structure, embodiments may be envisioned where this is not the case. Again, as long as the nodes 108 have the information on or can derive based on one of the received base station packets how the other base station packets are structured, the nodes will be able to correctly extract the data from the different base station packets and communicate in accordance with the present invention.

Third, for all of the packets described herein—not all of the fields described in the packet need to contain data. Some fields may be empty (i.e. contain no data at all) or e.g. contain an indication that nothing has changed since the last packet.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The modules and functions describe in this disclosure may be implemented as one or more hardware devices, e.g. one or more (dedicated) microprocessors, as one or more software programs, i.e. software code portions configured for, when run in the memory associated with a computer or a microprocessor that is configured to execute the code in order to produce the desired functionality; or, as a combination of hardware devices and software programs.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the one or more processors 210, described herein.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. For example, aspects of the present invention may be implemented in hardware or software or in a combination of hardware and software. Therefore, the scope of the present invention is determined by the claims that follow.

What is claimed is:

1. A method for a node of a plurality of nodes to communicate with a base station using frequency hopping over M frequency channels ($CH_1$-$CH_M$) in a wireless network, M being an integer equal to or greater than 2, according to a time slot schedule comprising M time slot assemblies ($A_1$-$A_M$), each time slot assembly ($A_i$) of the M time slot assemblies ($A_1$-$A_M$) comprising at least one time slot ($TXbs_i$) for the base station to transmit data on a different channel of the M frequency channels, and R time slots ($TXrn_{1,i}$-$TXrn_{R,i}$), R being an integer equal to or greater than 1, for one or more of the plurality of nodes to transmit data to the base station, the method comprising:

monitoring one of the M frequency channels to receive a first communication packet from the base station;

based on data contained within the first communication packet received from the base station, determining a sequence of channels of at least some of the M frequency channels that the base station will follow to transmit one or more of subsequent communication packets and the times at which the base station will transmit on each channel of the determined sequence of channels;

determining, from at least one of the first communication packet and the one or more of the subsequent communication packets, assignment information for the node, wherein the assignment information indicates for at least one time slot assembly of the M time slot assemblies ($A_1$-$A_M$) a channel of the M frequency channels for transmission of data from the node to the base station and which one or more of the R time slots is to be used for the transmission of data from the node to the base station, wherein channels assigned to the node for transmission of data in different ones of the time slot assemblies ($A_1$-$A_M$) are different channels of the M frequency channels, wherein the channels are assigned to the node for transmission of data so that if a channel is also assigned to another node of the plurality of nodes for transmission of data in a same time slot of the R time slots, then the channel assigned to the other node and the channel assigned to the node for transmission of data in the same time slot of the R time slots are different channels of the M frequency channels, and wherein at least two of the plurality of nodes are assigned channels for transmission of data in a same time slot for at least one of the R time slots; and transmitting data from the node to the base station in accordance with the determined assignment information.

2. The method according to claim 1, wherein the each time slot assembly ($A_i$) of the M time slot assemblies ($A_1$-$A_M$) further comprises U time slots ($TXun_{1,i}$-$TXun_{U,i}$), U being an integer equal to or greater than 1, for one or more of unregistered nodes to transmit data to the base station, wherein the one or more unregistered nodes comprise those nodes of the plurality of nodes which do not have the assignment information, and wherein the method further comprises:

determining, from the at least one of the first communication packet and the one or more of the subsequent communication packets, when at least one of the U time slots of the M time slot assemblies takes place; and transmitting a registration message to the base station within one time slot of the determined at least one of the U time slots, the registration message requesting the assignment information for the node.

3. The method according to claim 2, wherein the one time slot for transmitting the registration message is selected from the determined at least one of the U time slots using a pseudorandom number generator.

4. The method according to claim 1, wherein the node is configured to determine the sequence of channels of at least some of the M frequency channels that the base station will follow based on the channel on which the first communication packet was received from the base station and based on an indication of a current sequence of channels followed by the base station.

5. The method according to claim 4, wherein the indication of the current sequence of channels followed by the base station comprises a seed used by a pseudorandom sequence generator to generate the current sequence of channels followed by the base station.

6. The method according to claim 1, further comprising obtaining from the at least one of the first communication packet and the one or more of the subsequent communication packets one or more packets of data destined for the node.

7. The method according to claim 6, wherein the data in the one or more packets comprises CAN packet data.

8. The method according to claim 1, further comprising obtaining, from the at least one of the first communication packet and the one or more of the subsequent communication packets, one or more acknowledgements of the base station having received data previously transmitted by the node to the base station.

9. The method of claim 1 wherein the assignment information indicates for each time slot assembly of the time slot assemblies ($A_1$-$A_M$) the channel of the M frequency channels for transmission of data from the node to the base station.

10. The method according to claim 9 wherein the data transmitted by the base station in each of the time slot assemblies ($A_1$-$A_M$) comprises one or more of:

an identification of a current sequence of channels followed by the base station, wherein the current sequence of channels followed by the base station is a sequence of the different channels of the M frequency channels for the base station to transmit data in the M time slot assemblies ($A_1$-$A_M$), a channel sequence index identifying a current time slot assembly of the plurality of the time slot assemblies, one or more identifications of nodes of the plurality of nodes that have been denied registration, one or more packets of data destined for one or more of the plurality of registered nodes, and one or more acknowledgements of the base station having received data transmitted by one or more of the plurality of registered nodes.

11. A method for managing radio frequency communication between a base station and a plurality of nodes using frequency hopping over M frequency channels ($CH_1$-$CH_M$) in a wireless network, M being an integer equal to or greater than 2, the method comprising:

providing a time slot schedule comprising M time slot assemblies ($A_1$-$A_M$), each time slot assembly ($A_i$) of the time slot assemblies ($A_1$-$A_M$) comprising:

at least one time slot ($TXbs_i$) for the base station to transmit data on a different channel of the M frequency channels, and R time slots ($TXrn_{1,i}$-$TXrn_{R,i}$), R being an integer equal to or greater than 1, for a plurality of registered nodes to transmit data to the base station; and assigning to each registered node a channel of the M frequency channels for transmission of data from the node to the base station over a duration of at least one of the R time slots of the time slot assemblies ($A_1$-$A_M$), wherein:

for the each registered nodes, the channels assigned to the node for transmission of data in different time slot assemblies are different channels of the M frequency channels, the plurality of registered nodes is assigned so that two or more registered nodes assigned to transmit data to the base station in a same time slot of the R time slots are assigned to transmit data on a different channel of the M frequency channels, and at least two of the registered nodes are assigned channels for transmission of data in a same time slot for at least one of the R time slots.

12. The method according to claim 11, wherein assignment information for at least some of the plurality of registered nodes is transmitted as a part of the data transmitted by the base station during the at least one time slot, wherein the assignment information comprises information indicative of the at least one of the R time slots and the channel assigned to the registered node for the transmission of data from the node to the base station over the duration of the at least one of the R time slots.

13. The method according to claim 11, wherein the data transmitted by the base station during at least some of the time slot assemblies ($A_1$-$A_M$) comprises one or more of:

an identification of a current sequence of channels followed by the base station, wherein the current sequence of channels followed by the base station is a sequence of the different channels of the M frequency channels for the base station to transmit data in the M time slot assemblies ($A_1$-$A_M$), a channel sequence index identifying a current time slot assembly of the plurality of the time slot assemblies, one or more identifications of nodes of the plurality of nodes that have been denied registration, one or more packets of data destined for one or more of the plurality of registered nodes, and one or more acknowledgements of the base station having received data transmitted by one or more of the plurality of registered nodes.

14. The method of claim 13 wherein the data in the one or more packets comprises CAN packet data.

15. The method of claim 13 wherein the identification of the current sequence of channels comprises a seed used by a pseudorandom sequence generator to generate the current sequence of channels.

16. The method of claim 11 wherein transmission of assignment information for at least some of the plurality of registered nodes is divided substantially evenly among the M time slot assemblies ($A_1$-$A_M$).

17. A wireless node comprising a microcontroller configured to:

communicate with a base station using frequency hopping over M frequency channels ($CH_1$-$CH_M$) in a wireless network, M being an integer equal to or greater than 2, according to a time slot schedule comprising M time slot assemblies ($A_1$-$A_M$), each time slot assembly ($A_i$) of the M time slot assemblies ($A_1$-$A_M$) comprising at least one time slot ($TXbs_i$) for the base station to transmit, data on a different channel of the M frequency channels, and R time slots ($TXrn_{1,i}$-$TXrn_{R,i}$), R being an integer equal to or greater than 1, for one or more of a plurality of nodes to transmit data to the base station;

monitor one of the M frequency channels to receive a first communication packet from the base station;

based on data contained within the first communication packet received from the base station, determine a sequence of channels of at least some of the M frequency channels that the base station will follow to transmit one or more of subsequent communication packets and the times at which the base station will transmit on each channel of the determined sequence of channels;

determine, from at least one of the first communication packet and the one or more of the subsequent communication packets, assignment information for the node, wherein the assignment information indicates for at least one time slot assembly of the M time slot assemblies ($A_1$-$A_M$), a channel of the M frequency channels for transmission of data from the node to the base station and which one or more of the R time slots is to be used for the transmission of data from the node to the base station, wherein the channels assigned to the node for transmission of data in different ones of the time slot assemblies ($A_1$-$A_M$) are different channels of the M frequency channels, wherein the channels are assigned to the node for transmission of data so that if a channel is also assigned to another node of the plurality of nodes for transmission of data in a same time slot of the R time slots, then the channel assigned to the other node and the channel assigned to the node for transmission of data in the same time slot of the R time slots are different channels of the M frequency channels, and wherein at least two of the plurality of nodes are assigned channels for transmission of data in a same time slot for at least one of the R time slots; and transmit data from the node to the base station in accordance with the determined assignment information.

18. The wireless node of claim 17 wherein the assignment information indicates for each time slot assembly of the time slot assemblies ($A_1$-$A_M$) the channel of the M frequency channels for transmission of data from the node to the base station.

19. A time slot scheduler for managing radio frequency communication between a base station and a plurality of nodes using frequency hopping over M frequency channels ($CH_1$-$CH_M$) in a wireless network, M being an integer equal to or greater than 2, the time slot scheduler comprising a microcontroller configured to:

provide a time slot schedule comprising M time slot assemblies ($A_1$-$A_M$), each time slot assembly ($A_i$) of the time slot assemblies ($A_1$-$A_M$) comprising:

at least one time slot ($TXbs_i$) for the base station to transmit data on a different channel of the M frequency channels, and R time slots ($TXrn_{1,i}$-$TXrn_{R,i}$), R being an integer equal to or greater than 1, for a plurality of registered nodes to transmit data to the base station; and assign to each registered node a channel of the M frequency channels for transmission of data from the node to the base station over a duration of at least one of the R time slots of the time slot assemblies ($A_1$-$A_M$), wherein:

for the each registered nodes, the channels assigned to the node for transmission of data in different time slot assemblies are different channels of the M frequency channels, the plurality of registered nodes is assigned so that two or more registered nodes assigned to transmit data to the base station in a same time slot of the R time slots are assigned to transmit data on a different channel of the M frequency channels, and at least two of the registered nodes are assigned channels for transmission of data in a same time slot for at least one of the R time slots.

20. The time slot scheduler according to claim 19 and further comprising:

a transmitter configured to transmit data during the at least one time slot for the base station to transmit data, the transmitter configured to transmit the data by sequentially transmitting on a different one of the M frequency channels; and M receivers configured to receive data from the plurality of nodes during at least the R time slots for the plurality of registered nodes to transmit data, each of the M receivers configured to receive data on a different one of the M frequency channels.

21. A non-transitory computer-readable storage medium for storing a data structure, said data structure being configured for a base station to transmit data during one time slot assembly of M time slot assemblies ($A_1$-$A_M$) on a different frequency channel of a sequence of channels followed by the base station, the sequence of channels comprising M different frequency channels ($CH_1$-$CH_M$) in a wireless network, M being an integer equal to or greater than 2, each time slot assembly ($A_i$) of the M time slot assemblies ($A_1$-$A_M$) comprising at least one time s lot ($TXbs_i$) for the base station to transmit data on a different channel of the M frequency channels, and R time slots ($TXrn_{1,i}$-$TXrn_{R,i}$), R being an integer equal to or greater than 1, for one or more of a plurality of nodes to transmit data to the base station, the data structure comprising:

assignment information for at least some of a plurality of registered nodes, wherein the assignment information indicates for at least one time slot assembly of the M time slot assemblies ($A_1$-$A_M$) a channel of the M frequency channels for transmission of data from the node to the base station, and for each of the at least some of the plurality of registered nodes which one or more of the R time slots is to be used for the transmission of data from the node to the base station, wherein channels assigned to the node for transmission of data in different ones of the time slot assemblies ($A_1$-$A_M$) are different channels of the M frequency channels, wherein the channels are assigned to the node for transmission of data so that if a channel is also assigned to another node of the plurality of nodes for transmission of data in a same time slot of the R time slots, then the channel assigned to the other node and the channel assigned to the node for transmission of data in the same time slot of the R time slots are different channels of the M frequency channels, and wherein at least two of the plurality of nodes are assigned channels for transmission of data in the same time slot for at least one of the R time slots.

* * * * *